(12) United States Patent
Morgan et al.

(10) Patent No.: US 6,411,874 B2
(45) Date of Patent: Jun. 25, 2002

(54) ADVANCED LAW ENFORCEMENT AND RESPONSE TECHNOLOGY

(75) Inventors: Joseph Morgan; Johnny R. Hausman, both of College Station; Shawn Chilek, Bryan; Greg Hubenak, Euless; David Kappler, Bryan; John Witz; George B. Wright, both of College Station, all of TX (US)

(73) Assignee: Texas A&M University Systems, College Station, TX (US)

( * ) Notice: Subject to any disclaimer, the term of this patent is extended or adjusted under 35 U.S.C. 154(b) by 0 days.

(21) Appl. No.: 09/764,924

(22) Filed: Jan. 18, 2001

Related U.S. Application Data

(63) Continuation of application No. 08/912,676, filed on Aug. 18, 1997, now Pat. No. 6,188,939.

(51) Int. Cl.$^7$ ................................................. G06F 7/00
(52) U.S. Cl. ........................ 701/36; 340/902; 340/468
(58) Field of Search ....................... 701/36, 35; 348/118, 348/148, 149; 340/902, 937, 468, 472, 474, 384.4

(56) References Cited

U.S. PATENT DOCUMENTS

| | | |
|---|---|---|
| 4,392,187 A | 7/1983 | Bornhorst |
| 4,396,977 A | 8/1983 | Slater et al. |
| 4,479,197 A | 10/1984 | Haag et al. |
| 4,769,762 A | 9/1988 | Tsujido |
| 4,818,010 A | 4/1989 | Dillon |
| 4,829,294 A | 5/1989 | Iwami et al. |
| 4,833,592 A | 5/1989 | Yamanaka |
| 4,980,837 A | 12/1990 | Nunn et al. |
| 5,140,304 A | 8/1992 | Miller |
| 5,154,617 A | 10/1992 | Suman et al. |
| 5,212,628 A | 5/1993 | Bradbury |
| 5,226,540 A | 7/1993 | Bradbury |
| 5,296,840 A * | 3/1994 | Gieffers ...................... 340/474 |
| 5,404,443 A | 4/1995 | Hirata |
| 5,408,330 A | 4/1995 | Squicciarini et al. |
| 5,442,512 A | 8/1995 | Bradbury |
| 5,461,560 A | 10/1995 | Uribe |
| 5,463,227 A | 10/1995 | Stern et al. |
| 5,515,267 A | 5/1996 | Alsenz |
| 5,573,300 A | 11/1996 | Simmons |
| 5,590,022 A | 12/1996 | Harvey |
| 5,815,126 A * | 9/1998 | Fan et al. ...................... 345/8 |
| 6,616,066 A | 12/2000 | Wright et al. |

* cited by examiner

Primary Examiner—Yonel Beaulieu
(74) Attorney, Agent, or Firm—Shawn K. Hunter; Anthony P. Ng; Bracewell & Patterson, L.L.P.

(57) ABSTRACT

A central control system is described that affords intuitive and easy control of numerous subsystems associated with a police car or other emergency vehicle and reduces the cockpit clutter associated with present control systems. A single user interface device is associated with a central controller capable of receiving input commands and outputting device control commands to a plurality of controlled devices or subsystems. Preferably, the central controller comprises a programmable digital computer. An emergency response system is also described which rapidly coordinates and controls operation of a plurality of emergency subsystems associated with the vehicle in accordance with a predetermined scheme of operation for the devices. In one preferred embodiment, the controller receives a single input command and, in response, provides specific device control commands to several individual controlled devices on a relatively simultaneous basis. A hierarchical device command structure is also taught which permits individual control of features among each of the controlled subsystems.

16 Claims, 14 Drawing Sheets

Microfiche Appendix Included
(8 Microfiche, 728 Pages)

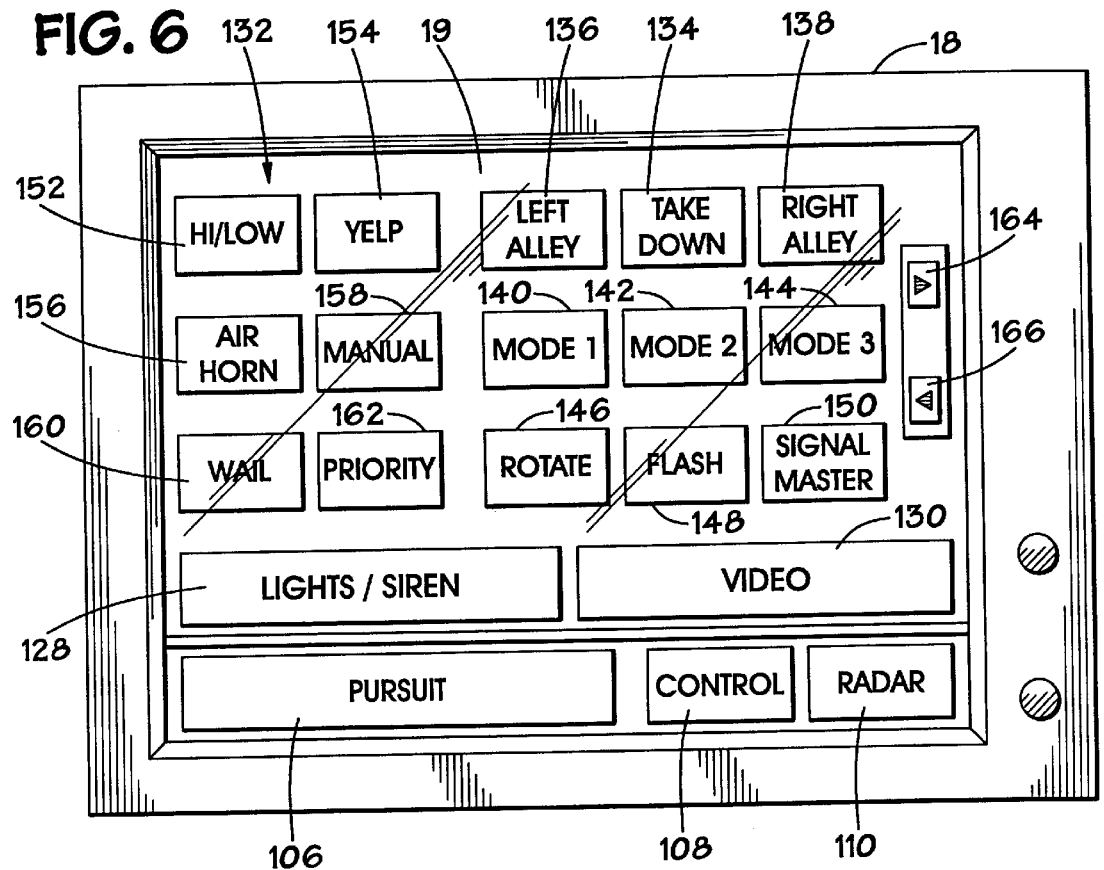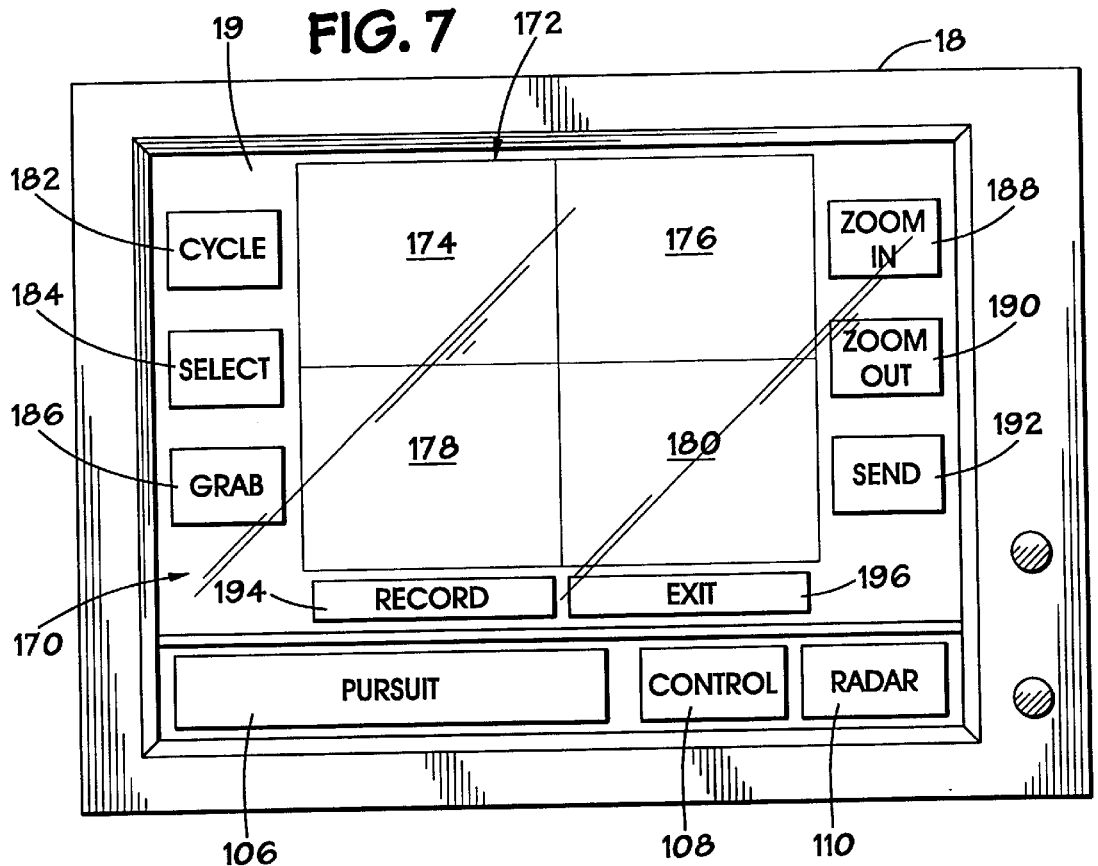

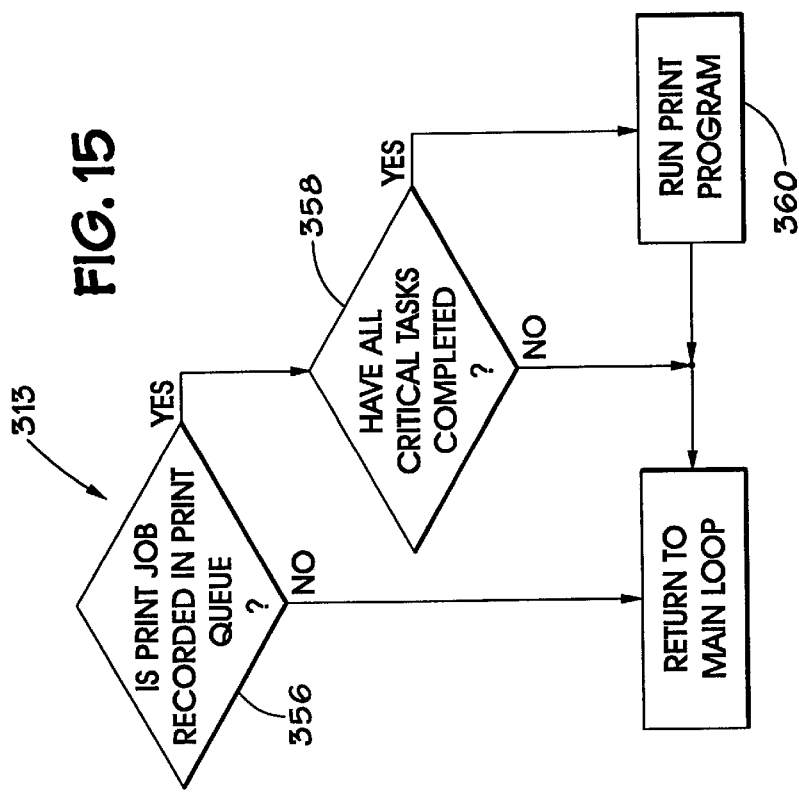
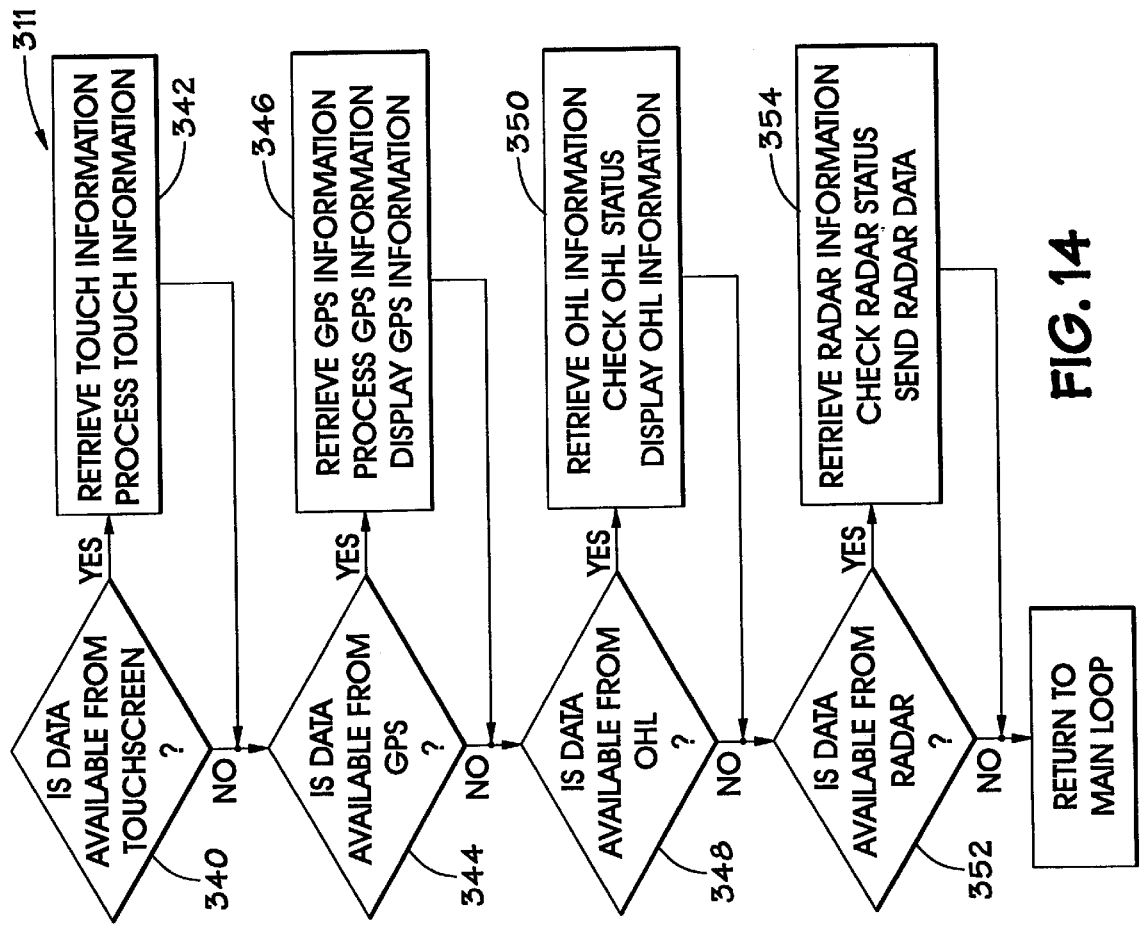

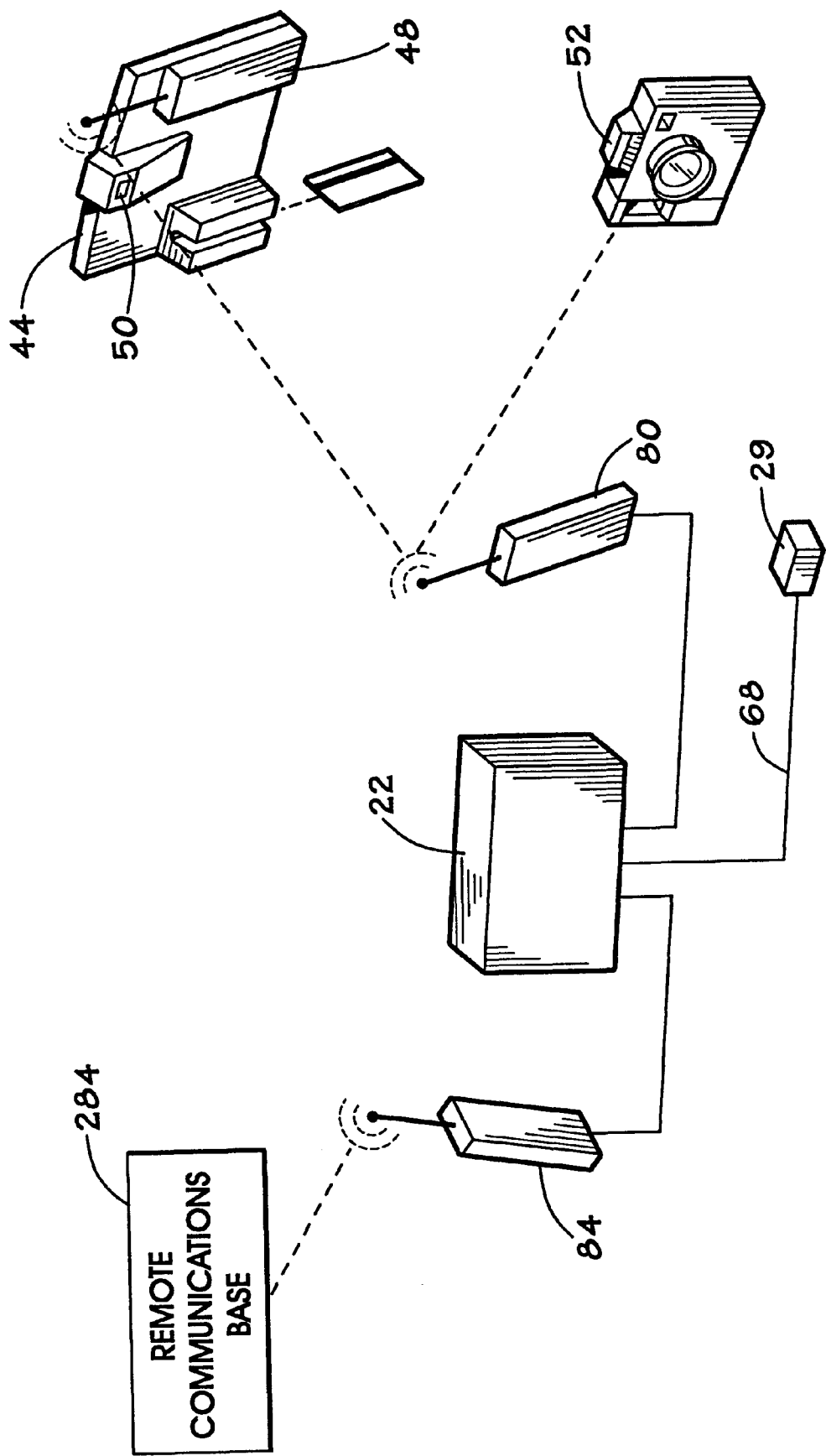

FIG. 17

ADVANCED LAW ENFORCEMENT AND RESPONSE TECHNOLOGY

CROSS-REFERENCE TO RELATED APPLICATIONS

This application is a continuation of Ser. No. 08/912,767, now U.S. Pat. No. 6,188,939, filed on Aug. 18, 1997.

STATEMENT REGARDING FEDERALLY SPONSORED RESEARCH OR DEVELOPMENT

The U.S. government has a paid-up license in this invention and the right in limited circumstances to requires the patent owner to license others on reasonable terms, as provided for by the terms of Work Order No. DTFH71-94-TE037-TX-29 awarded by the U.S. Department of Transportation, Federal Highway Administration.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

REFERENCE TO MICROFICHE APPENDIX

Computer program code for devices and methods described herein are contained in a microfiche appendix which consists of 8 microfiche having a total number of 728 microfiche frames.

BACKGROUND OF THE INVENTION

1. Field of the Invention

The present invention relates generally to improved devices and methods for controlling vehicle peripheral devices and subsystems, such as sirens, light bars, radar systems and so forth. Further, the invention relates to an emergency response system for rapidly coordinating and controlling the operation of numerous emergency vehicle peripheral subsystems. In other aspects, the invention relates to devices and methods for transmitting and relaying data, such as information and messages, remotely to, through and from an emergency vehicle.

2. Description of the Related Art

Police cars and other emergency vehicles such as ambulances and fire trucks, carry a number of necessary peripheral subsystems which must be activated and controlled by the vehicle operator. These systems include sirens, light bars (flashers), radios and spotlights. Over the years, the number and complexity of these peripheral devices and subsystems has grown significantly. Conventional police cars are now also equipped, for example, with radar systems for tracking the speeds of roadway vehicles, video cameras, video cassette recorders, global positioning satellite (GPS) systems, and/or global position imaging (GPI) systems. Each of these devices has its own associated, individual control device which is usually a panel, box or control head that is mounted to or around the vehicle console so that it can be operated by the driver.

Controlling operation of a large number of peripheral devices individually can be difficult, especially in an emergency situation where a police officer cannot afford to be distracted. Having a large number of control devices which must be operated, requires the officer to direct his attention to, and then operate, numerous buttons and switches to separately control each individual device. This presents a safety hazard for both officers and bystanders.

In addition to the control problem, "cockpit clutter" has become an issue. The proliferation of control boxes or control heads mounted in the passenger compartment has caused the console area to become cluttered. These control devices can block the peripheral vision of a police officer. Also, deployment of the vehicle's air bag may be blocked in some instances, thus causing the control devices to become hazards during a collision.

A related problem addressed by the present invention is that of officer safety when the officer is outside of the police vehicle. During traffic stops, for example, an officer will leave his patrol car to obtain the driver's license and registration of a driver he has stopped. He must then return to his patrol car and, from the car, radio in information concerning the driver's license and registration in order to learn if the driver is wanted or if the vehicle the driver is driving has been stolen. The officer may be somewhat vulnerable to attack during this period because he must walk back to his patrol car and enter and exit it. Further, the officer does not have direct access to information contained within federal, state or local databases of traffic or criminal records. Therefore, he must request such information from a dispatcher and wait for it to be found and relayed to him. The process is time consuming and carries the risk that errors will be introduced in the relaying process.

A further problem addressed by the present invention relates to the time required to clear accident scenes. Currently, the average time required to clear an accident scene is 50 minutes. Accident scenes are usually located on or just off a roadway, thereby causing traffic to be delayed until the accident is cleared. A major portion of clearing time is spent with police officers completing numerous forms which identify the drivers of the vehicles involved in the accident, describe the relative locations of the vehicles, provide the driver's descriptions and so forth. Because some of the forms may require the same information, the officer must enter the same information numerous times. Because the information is entered numerous times, the chance of errors, due to disparities in the information entered, is increased.

Clearly, an invention which permits a police officer to rapidly coordinate and control the operation of his vehicle's emergency subsystems is needed. Also, an invention which improves safety for both officers and bystanders and reduces cockpit clutter is highly desirable.

SUMMARY OF THE INVENTION

In one aspect, the present invention is directed to a central control system that affords intuitive and easy control of the numerous subsystems associated with a police car or other emergency vehicle. The exemplary control system of the present invention also reduces the cockpit clutter associated with present control systems by removing the numerous individual control devices from the passenger compartment and replacing them with a single user interface device. The user interface device is associated with a central controller which is capable of receiving input commands and outputting device control commands to a plurality of controlled devices or subsystems. Preferably, the central controller comprises a programmable digital computer.

Additionally, the invention provides for an emergency response system which will rapidly coordinate and control the operation of a plurality of emergency subsystems associated with the vehicle in accordance with a predetermined scheme of operation for the devices. In one preferred embodiment, the controller receives a single input command and, in response, provides specific device control commands to several individual controlled devices on a relatively simultaneous basis. The invention also preferably offers a hierarchical device command structure which permits individual control of features among each of the controlled subsystems.

In another aspect, the present invention provides for improved data entry, and recordation with less paperwork for officers to have to complete. Data need only be entered one time ensuring its integrity and eliminating errors which tend to occur due to multiple entry of the same information. Because the information will only need to be entered one time, there is an obvious time savings as well.

In still another aspect, the invention relates to a self-contained portable or hand held computer unit into which information is entered by a police officer when he is, for example, away from the police vehicle. The hand held computer unit is capable of storing the entered information, processing it and transmitting information to and from the central controller within the vehicle.

In other aspects, the present invention provides for a remote data entry and communication means which permits police officers or other emergency workers to enter data or information into the hand held unit such that a computerized "form" is completed, data representing the completed form is then transmitted to the controller within the police vehicle and printed out on a printer within the vehicle. Additionally, the data or information can be transmitted from the controller to a remote communications base for storage in a central data repository.

In yet another aspect, the invention permits officers to obtain information directly from databases of federal, state and local traffic and criminal records without the need for a dispatcher to relay the information to the officer.

BRIEF DESCRIPTION OF THE DRAWINGS

FIG. 6 depicts another exemplary touch screen display.

FIG. 7 depicts a further exemplary touch screen display which incorporates video displays.

FIGS. 11–15 are flow charts depict subparts of the exemplary control algorithm shown in FIG. 10.

FIG. 16 is a graphical depiction of aspects of communication features of the present invention.

FIG. 17 depicts an exemplary screen display for data entry for the HHU 44.

DETAILED DESCRIPTION OF THE PREFERRED EMBODIMENTS

Figure 1:
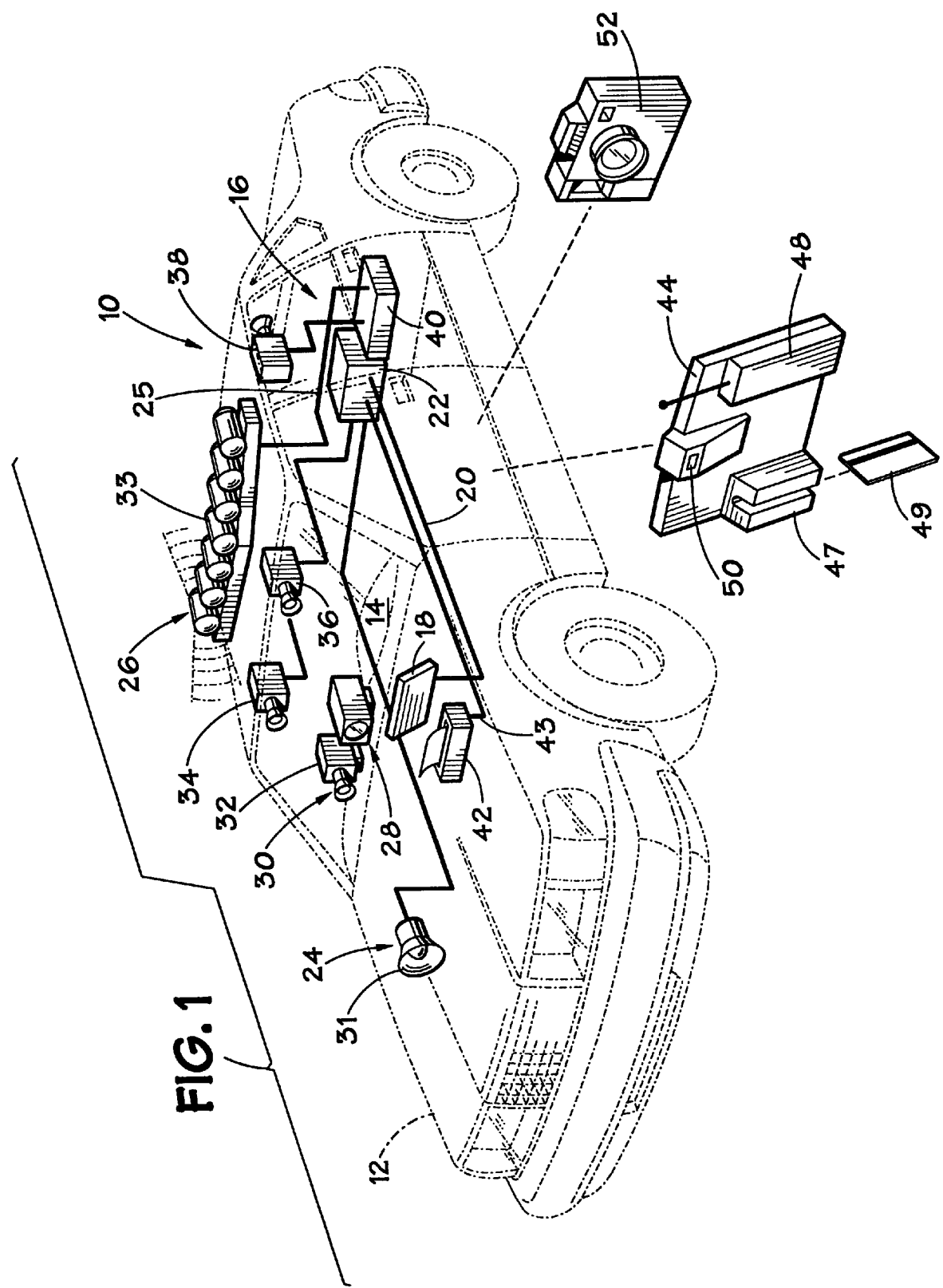
FIG. 1 depicts a physical layout for an exemplary control system constructed in accordance with the present invention incorporated within a police car.

Referring first to FIG. 1, components of an exemplary control system, indicated generally at 10, are shown incorporated within an exemplary police vehicle 12, which is shown in phantom lines. Although the system 10 is described in conjunction with a police vehicle, it should be understood that the invention has application to other vehicles such as ambulances and fire trucks and even private vehicles. Further, the invention maybe adapted for use with helicopters, water craft and so forth. As is well known, the vehicle 12 includes a passenger compartment 14 and separate storage compartment, or trunk, 16. A user interface device 18 is mounted within the passenger compartment 14. In the depicted embodiment, the user interface device 18 features a touch-sensitive screen console or "touch screen" 19 (shown in FIGS. 3–8). A preferred touch screen is an LCDVGA-PC model touch screen device available from Kinetic Computer Corporation, 270 Third Street, Cambridge, Mass. 02142.

Other mechanisms may also be employed as user interface devices, including keyboards, or push button keypads with associated monitors, without departing from the scope and spirit of the invention. A touchscreen is currently preferred as a user interface device because it is not particularly bulky, and it readily permits a user to input commands and information while displaying information to the user in an interactive manner by presenting a graphical control panel of controls, as will be described in further detail shortly. It is preferred that the user interface device 18 be mounted proximate the center console of the vehicle 12's dashboard and should not obstruct deployment of either driver or passenger side airbags. Because only a single interface or control device is mounted in the passenger compartment 14 of the vehicle, the passenger compartment 14 is not cluttered with numerous control heads, thereby resulting in a "clean cockpit." A data bus 20 operably interconnects the user interface device 18 with a central vehicle based controller 22 which is mounted within the trunk 16 of the vehicle.

A number of devices or subsystems, which will be referred to as peripheral subsystems, are interrelated with the police vehicle 12 for use by police officers in performing their duties. Referring again to FIG. 1, the exemplary police vehicle 12 is equipped with a siren subsystem, shown generally at 24; a light bar subsystem, shown generally at 26; a traffic radar subsystem, shown generally at 28; a GPS subsystem, shown generally at 29 in FIG. 2, and a video camera subsystem, shown generally at 30.

As is well known, each of the subsystems basically consists of an activated component and a control head (not shown) which is used to control the activated component. The present invention permits the manufacturer's control heads to be removed from these subsystems so that each of the subsystems is capable of being controlled only by the controller 22. It is presently preferred, however, that the individual control heads for the subsystems may be located within the trunk 16 of the vehicle 12 and wired in parallel to the controller 22. The advantage to this type of arrangement is that, in the event of a malfunction in the controller 22 or the user interface device 18, the control heads can be relocated into the passenger compartment so that the subsystems can still be operated. Further, certain jurisdictions may require, for example, that an officer's traffic radar readings be taken from a radar system control head which has been properly certified in order for citations to be issued based upon a traffic radar system. Therefore, the ability to reference the original system control head may be necessary.

The siren subsystem 24 includes a siren speaker 31 and a conventional control head (not shown). The siren subsystem 24 is capable of being selectively operated in a plurality of modes. Each mode provides for production of a particular siren sound from the siren speaker 31: For example, a siren subsystem 24 might be operable in modes including "YELP," "AIR HORN," "WAIL" and so forth, each of which corresponding to a well-known sound associated with an emergency vehicle siren. Particular siren modes are typically prescribed by individual police department policy for use in particular situations.

Figure 2:
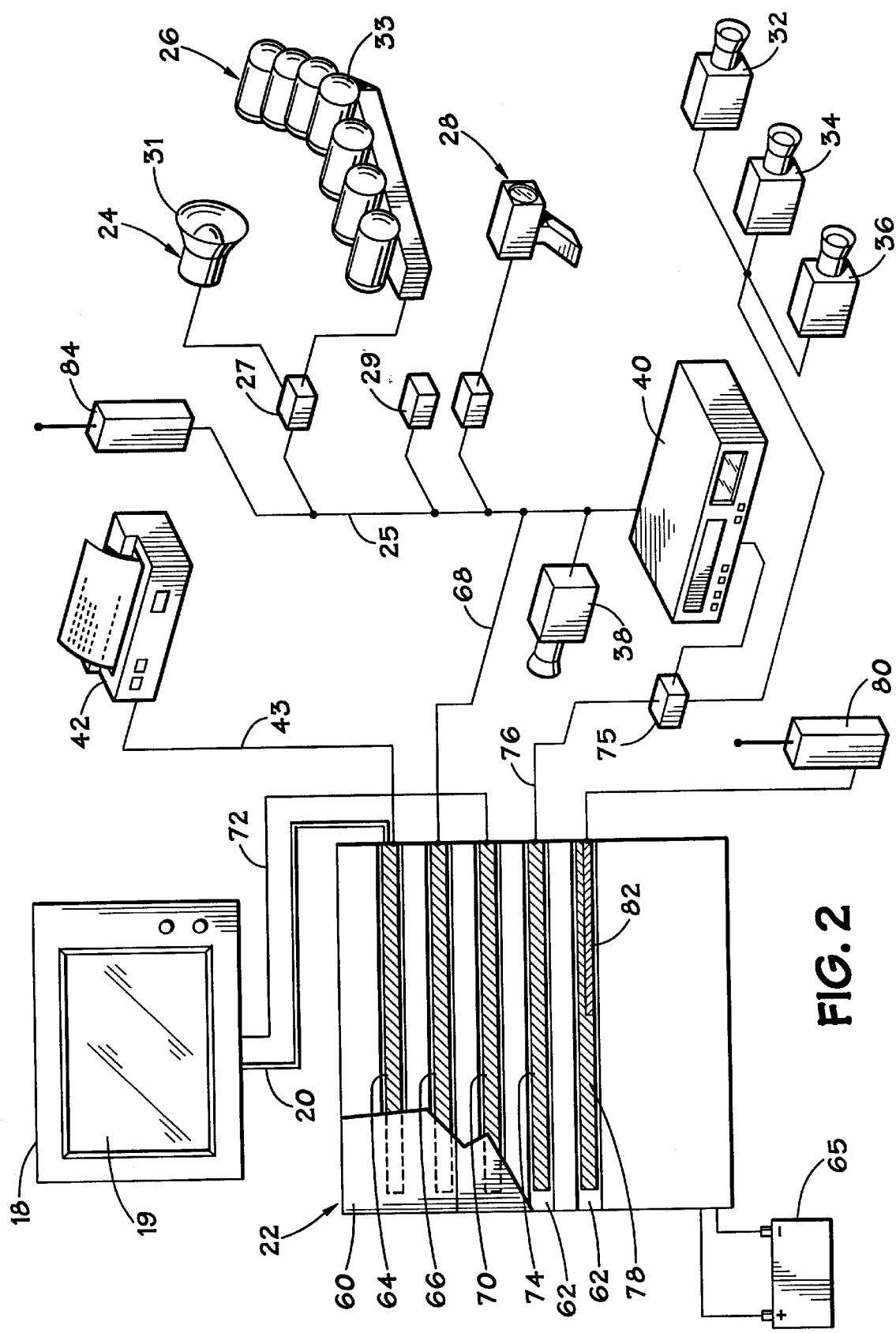
FIG. 2 shows a layout of components and connections for the exemplary control system shown in FIG. 1.

The light bar subsystem 26 includes an elongated light bar which is typically mounted perpendicular to the length of the vehicle 12 and includes rows of white, red, blue and/or amber lights which are capable of being flashed and rotated in accordance with pre-programmed patterns. Particular programmed patterns are typically prescribed by individual department policy for use in particular situations. Further general descriptions concerning operation of light bar and siren systems are found in U.S. Pat. No. 5,140,304 entitled "Siren Sound Synchronized Light Bar System," issued to Miller and U.S. Pat. No. 4,980,837 entitled "Circuit and Method for Automatically Sweeping Through a Plurality of Siren Modes" issued to Nunn et al. Currently, many siren subsystems and light bar subsystems are marketed as a single unit. An example of an apparatus suitable for use as the siren subsystem 24 and the light bar subsystem 26 is the Premium Vision© Warning System marketed by Signalvations Corporation of 18506 South 81S' Avenue, Tinley Park, Ill. 60477. Standard RS-232 cables, shown schematically as 25 in FIG. 2, are used to interconnect the light bar subsystem 26 and other subsystems with the central controller 22. A voltage shifter 27 (visible in FIG. 2) is used to step the voltage between the components from the +12/–12 V voltage used by the controller 22 to the 0–5 V voltage used by the light bar system 26.

The traffic radar subsystem 28 is of the type currently made and marketed by Kustom Signals, Inc. of 9325 Pflumm Road, Lenexa, Kans. 66215-3347. As in well known, radar subsystems of this type are capable of detecting and recording the speeds of vehicles travelling on a roadway. The radar subsystem 28 is capable of being operated in a plurality of different modes. For example, radar subsystem 28 could be selectively switched between tracking of vehicle speeds for vehicles which are located generally in front of the police vehicle 12 or, alternatively, tracking the speeds of those located to the rear of the police vehicle 12.

The video camera subsystem 30 includes a frame grabber assembly which is capable of selecting, displaying and transmitting a still image from one of several cameras. A frame grabber assembly suitable for this application is marketed by hmageNation™, P.O. Box 276, Beaverton, Oreg. 97075-0276. In the preferred embodiments described here, the video camera subsystem 30 includes four cameras 32, 34, 36 and 38. As is apparent from FIG. 1, one camera 32 is pointed so as to be able to capture the field of view immediately in front of the police vehicle 12. Two of the cameras 34, 36 are aimed so that they can cover the fields of view to the right front and left front of the vehicle 12, respectively. The fourth camera 38 is aimed rearwardly so that video of the area behind the vehicle 12 may be captured. Alternatively, this fourth camera 38 may be mounted so that it will capture the back seat area of the vehicle 12. The four cameras 32, 34, 36 and 38 are operationally interconnected through a multiplexer (75 in FIG. 2) which makes up part of the frame grabber assembly and permits one of the four cameras 32, 34, 36 or 38 to be selected for individual control as a "primary camera." A VCR (video cassette recorder) 40, which is also a part of the video camera subsystem 30, is located in the trunk 16 and operably connected so as to record images photographed by one or more of the cameras 32, 34, 36, 38. In practice, one of the cameras, 32, 34, 36 or 38 becomes the "primary camera" while the other three cameras are "secondary cameras." As will be described in greater detail shortly, the camera which is the primary camera can be controlled by the operator, to be panned and scanned, focused, zoomed in or out, and so forth. The secondary cameras cannot be so controlled.

A printer 42 is mounted in the passenger compartment 14 of the vehicle 12 and is interconnected by a printer cable 43 to the central controller 22.

Figure 1A:
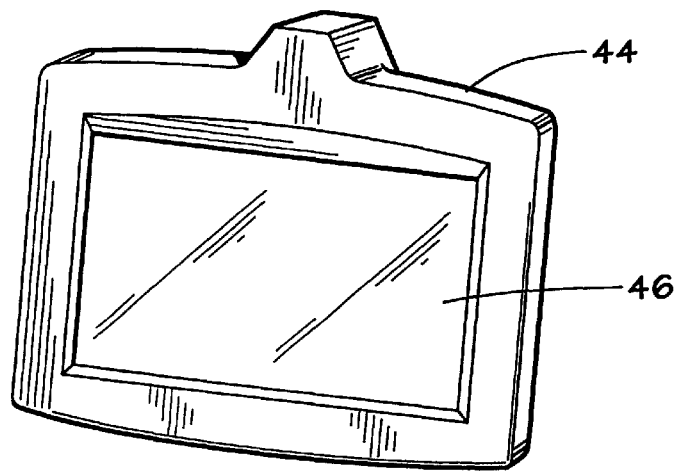
FIG. 1A is a front view of an exemplary portable pen-based computer device.

FIG. 1 and 1A depict a pen-based portable computer, or hand held unit (HHU) 44, which is associated with the vehicle 12 in a manner which will be described. The HHU 44 includes a touch-sensitive screen surface 46 which is visible in FIG. 1A. The HHU also contains internal memory or information storage media so that information which is entered into the HHU 44 will be stored therein. Data may be entered into the HHU 44 by selecting or "writing" information upon the touch screen surface 46 with an electronic "pen" or "stylus" in a manner known in the art. Currently available pen-based computers suitable for use in this application include the model PPT-4600 from Symbol Technologies which has offices at 10333 Northwest Freeway, Suite 100, Houston, Tex. 77092.

A wireless LAN adapter 48 (visible in FIG. 1) is affixed and operably interconnected with the HHU 44 for transmission of data entered into the HHU 44 to the central controller 22 in the vehicle 12. Currently, a suitable LAN adapter for this application is the Range LAN 2 7200 available from Proxim, Inc., 295 N. Bernardo Avenue, Mountain View, Calif. 94043. The Range LAN 2 7200 is a wireless LAN adapter having a PCMCIA type II card interface by which it can be operatively interconnected with the HHU 44. This type of LAN adapter is capable of transmission and receipt of digital information over a relatively small distance, perhaps a radius of 500 feet or less, but within a relatively wide signal bandwidth, thereby permitting relatively rapid data transmission.

In addition to the wireless modem 48, the HHU 44 also preferably includes a two dimensional barcode scanner 50 of a type known in the art. The barcode scanner 50 is operable for scanning a barcode and storing the information that is encoded within the barcode into the memory of the HHU 44. The HHU 44 then displays the encoded information on the touch sensitive screen surface 46.

If desired, the HHU 44 may also incorporate a magnetic stripe reader 47, such as the Mag-Tek Card Reader from Mag-Tek Corporation, 2075 South Annalee, Carson, Calif. 90756, of the type known for reading information encoded in magnetic stripes on credit cards and the like and transmitting the information to a computer. This type of magnetic stripe reader is operationally interconnected with the HHU 44 by interfitting a cable connection into a keyboard input plug on the HHU 44. The magnetic stripe reader 47 is used to input information that is encoded on cards, such as card 49 in FIG. 1, into the internal memory of storage of the HHU 44.

A digital camera 52 is shown in FIG. 1 associated with the vehicle 12. One suitable digital camera for this application is the Kodak series 120 digital camera. The digital camera 52 is capable of capturing images digitally and storing them on a digital storage media within the camera 52. There is also associated with the digital camera 52 a means for transmitting the captured images from the camera 52 to an external destination, such as the memory of the central controller 22. In one embodiment, the digital camera 52 is supplied with a wireless LAN network interface (not shown) similar to that described previously. Such wireless interfaces may be supplied by the manufacturer of the camera 52. When the wireless LAN interface is included, the digital images that are captured by the digital camera 52 can be transmitted to a LAN adapter or other receiver by the wireless LAN interface. This transmission occurs in a relatively continuous fashion since the LAN adapters 48 and 80 utilize a TCP/IP stack buffer which ensures sequential storage and retrieval of the data making up the digital images. If a wireless transmission means is unavailable or not desired, digital images captured by the camera 52 can also be transferred from the camera to another storage means via a cable connection such as an RS-232 serial connection (not shown) using well known techniques for the transfer of digital information through such a connection. Alternatively, the digital images may be stored on an intermediate media which is then physically transported from the camera 52 to another storage means. For example, a PCMCIA compatible flash disk can be inserted into the camera 52 for storage of the images thereupon. The flash disk containing the stored images is then be removed from the camera 52 and placed into a slot in a PCMCIA drive disposed in one of a slot 62 within the controller 22. Although this drive is not shown in FIG. 2, the use and operation of them is well known.

Digital images which have been transmitted from the camera 52 to memory or storage within the controller 22 can then be accessed from storage, or from the PCMCIA drive described in the latter embodiment, by the controller for display on the touch screen 19 of the user interface device 18.

Referring now to FIG. 2, physical connections are depicted showing the interconnection of certain components of the exemplary control system 10. As shown, the central controller 22 is made up of an outer housing 60 of the type used to house motherboards and related computer hardware boards and contains a number of parallel card slots 62. One of the slots 62 contains a motherboard 64 which contains a microprocessor. A presently available motherboard suitable for this application is a Ziatech ZT-8902 module which contains a 100 Mhz 486-class microprocessor with 16 MB of RAM. The ZT-8902 module is available from Ziatech Corporation, 1050 Southwood Drive, San Luis Obispo, Calif. 93401-5813. The motherboard 64 should also have associated data storage from which data may be selectively stored and retrieved. Power is supplied to the controller 22 by the vehicle battery 65.

The housing 60 also contains an intelligent serial controller (ISC) board 66, such as the ZT-8932 intelligent multi-channel serial controller, also available from Zlatech Corporation, 1050 Southwood Drive, San Luis Obispo, Calif. 93401-5813. A read/write interface (not shown) is provided between the motherboard 64 and the ISC board 66. The ISC board 66 provides a plurality of sequential serial control connections, shown schematically at 68 in FIG. 2, which interconnect the controller 22 with a number of the subsystems for the vehicle 12. The Ziatech ZT-8932 controller, for example, provides eight independent RS 232 compatible serial ports to which devices or subsystems can be operatively interconnected.

Included within yet another slot 62 in the housing 60 is a video card 70 which is interconnected with the touch-screen interface device 18 by control cable 72 so that video functions of the touch-screen 18 are controlled by the central controller 22.

A frame grabber control card 74 is disposed within another slot 62 in the controller housing 60. The frame grabber control card 74 is used to control the frame grabber assembly portion of the video camera subsystem 30 in a manner which will be described in greater detail shortly. A cable 76 operably connects the card 74 to a video multi-plexer 75. The multiplexer 75 is also interconnected by cables to the VCR 40 and cameras 32, 34, 36 and 38. Examples of VCRs that are cable ready so that they maybe connected in this manner are Panasonic models AG-6124P and AG-1070DCP.

In yet another slot 62 in the central controller housing 60, a PCMCIA interface card 78 is disposed, which permits the controller 22 to interface with and operate a device whose typical control is provided via PCMCIA. A suitable example of such a card is a Ziatech Model 8921 module that provides 5–20 MB of flash disk storage capacity. A Range LAN 2 7200 wireless LAIN adapter 80 is operably interconnected with the interface card 78 through a PCMCIA card 82 for operation of the LAN adapter 80 by the central controller 22. The LAN adapter 80 is preferably the same as the LAN adapter 48 associated with the HHU 44, described earlier. The 14 LAN adapter 80 is capable of transmitting digital information to and receiving digital information from the LAN adapter 48.

A modem 84 is operatively interconnected with the ISC 66 of controller 22 so that the controller 22 can control the functions of the modem 84. The modem 84 is capable of transmitting and receiving digital information over wireless channels at a much greater range than a LAN adapter, such as adapters 48 and 80 described earlier, albeit currently at a slower rate of transmission. In one current preferred embodiment, the modem 84 comprises a circuit switched cellular modem such as a standard modem equipped with an appropriate adapter for a cellular telephone. One example is a 28.8K bps modem equipped with a model S1936C or S 1688E Cellular Connection. In a second preferred embodiment, the modem 84 comprises a CDPD modem which uses cellular digital packaging data (CDPD) as a carrier for information transmission. CDPD-type modems suitable for this application are currently marketed by Sierra Wireless, Inc., # 260, 13151 Vanier Place, Richmond, British Columbia, Canada V6V 2J2.

It is further pointed out that the control system 10 of the present invention is modular in design so that additional peripheral components maybe added or substituted as subsystems and then be controlled centrally. In most cases, component compatibility can be assured by using instruction sets provided with a component or available from its manufacturer.

In operation, the invention affords numerous advantages, many of which can be appreciated from the following discussion.

Control of Peripheral Devices/Subsystems

The touch screen type user interface device 18 serves a dual purpose. First, it displays information to the operator. Second, it permits the operator to enter input commands to the controller 22 so that the controller 22 can operate the various subsystems associated with the vehicle 12 through the selective provision of device control commands.

The user interface provided by the device 18 permits hierarchical menu structure interface for selection of one from among several individual controlled subsystems, and for providing device control commands to the selected subsystem. The user interface also features shortcut commands which are capable of providing device commands to a plurality of controlled subsystems relatively simultaneously.

FIGS. 3–8 depict exemplary screen displays for the touch screen 19 of the user interface device 18. As will be described, a user may essentially move through a hierarchical menu structure which is provided by the screens by making selections presented on the screens.

Figure 3:
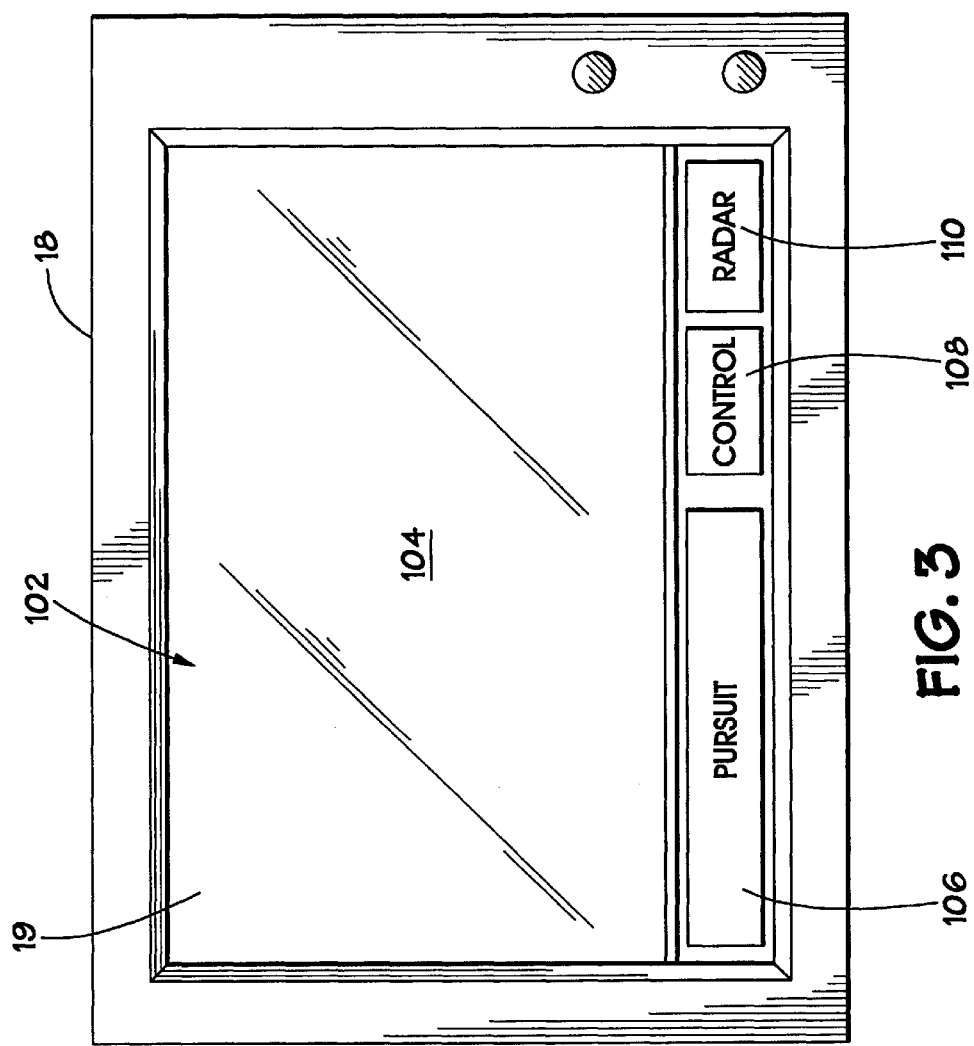
FIG. 3 depicts an exemplary main menu screen display for a touch screen user interface device.

A main menu screen 102 is depicted in FIG. 3, as displayed by the touch screen 19. As FIG. 3 shows, the main screen 102 displays a large blank area 104 which may be touched without selection of any option. The main screen 102 also displays a selection of "buttons" that are actually touch-sensitive areas of the screen 19 which are touched to select a particular available option. The buttons include a "PURSUIT" button 106, a "CONTROL" button 108 and a "RADAR" button 110. As can be seen by a review of FIGS. 3–8, these three buttons remain displayed on the screen 19 regardless of the particular screen display. Any of these three buttons may be selected at any time.

A "PURSUIT" mode is entered when the "PURSUIT" button 106 is selected. Selection of the "PURSUIT" button 106 provides detailed device commands to a plurality of subsystems relatively simultaneously and without the need to individually control each one of the subsystems. Selected controlled subsystems are actuated and caused to operate in a preprogrammed manner so that a coordinated response is provided by tha subsystems. The response of the system is coordinated to operate selected subsystems as deemed necessary to respond in a particular emergency situation. In this instance, the subsystems are operated as deemed effective or necessary to respond in a situation where the vehicle 12 must pursue another vehicle and apprehend the driver of that vehicle. First, the operation of each of the subsystems is coordinated by the controller 22 so that appropriate selected subsystems (such as the siren 24, light bar 26, radar 28 and GPS 29 subsystems) are caused to operate. Second, those subsystems which are capable of being operated in more than one mode are caused to operate in a mode appropriate to the predetermined operational scheme for vehicle pursuits. For example, the siren subsystem 24 may be operated so as to produce a "WAIL" sound, "AIR HORN" or other unique sounds, and the light bar subsystem 26 may be operated in one of several distinct modes as well. The particular preprogrammed manner in which each of these subsystems will operate while the control system 10 is placed in the PURSUIT mode is determined in accordance with a predetermined scheme for pursuit of vehicles. In most instances, the choice of which subsystems are operated, and the modes of operation for each subsystem is made on a jurisdictional basis as a matter of police departmental policy. Therefore, the siren sound used in a PURSUIT mode, for example, is chosen by a department from among a plurality of available modes.

Figure 4:
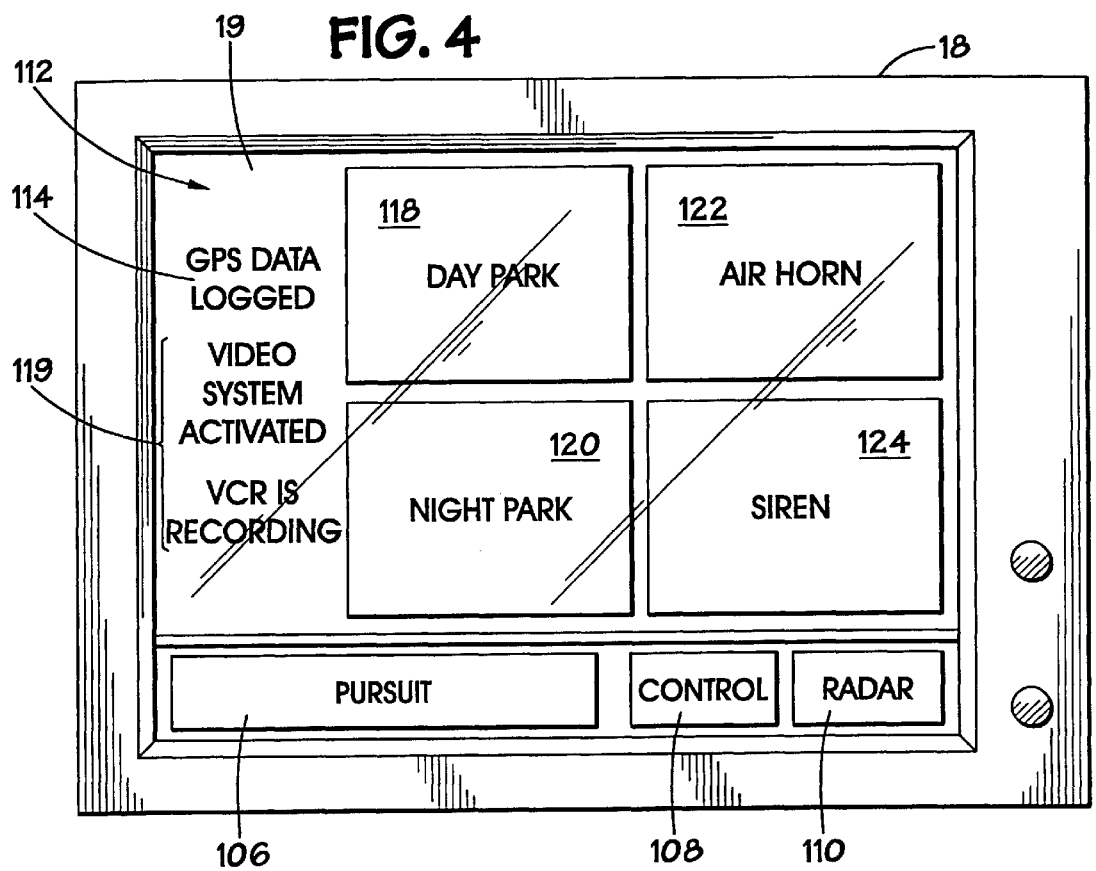
FIG. 4 depicts an exemplary screen display following activation of the PURSUIT command.

When the "PURSUIT" command is selected by touching the "PURSUIT" button 106, the display on screen 19 changes to a "PURSUIT" screen 112 which is shown in FIG. 4. The central controller 22 actuates the GPS subsystem 29 to record the location of the police vehicle 12 and transmit that information, in a manner which will be described, to a remote location, such as to the police dispatcher. A graphical note 114 is displayed on the screen 19 to indicate to the operator that the GPS subsystem 29 is performing this function. The siren subsystem 24 is activated to operate in a preprogrammed mode which has been prescribed by local department policy for pursuit situations. The light bar subsystem 26 is activated by the controller 22 to operate in a typical PURSUIT mode in which the pattern of the lights of the overhead light bar moves from the center of the light bar to the ends and back to the center in a "handclap" manner. Upon selection of the "PURSUIT" command, the controller 22 also activates the video 5 subsystem 30 so that the forward-looking camera 32 becomes the controlled "primary camera." The VCR 40 is actuated by the controller 22 to begin recording of the video captured by the forward looking camera 30. A graphical note 116 is also displayed on the screen 19 to indicate to the operator that these operations have occurred. In the "PURSUIT" mode, then, the control system 10 thus performs as an emergency response system which actuates and controls multiple emergency response subsystems in a preprogrammed manner.

Only minimal user input commands having to be provided to the controller 22. Thus, the invention allows a user to rapidly coordinate the response of a plurality emergency subsystems when required in accordance with a common scheme.

In the "PURSUIT" screen 112, depicted in FIG. 4, the blank area 104 of the main screen 102 is replaced by buttons which provide for further detailed control commands for the light bar subsystem 26 and siren subsystem 24. Among these control commands are a "DAY PARK" button 118 and a "NIGHT PARK" button 120, each of which correspond to powersaving modes of operation for the light bar subsystem 26. An "AIR HORN" button 122.and a "SIREN" button 124 are also provided for selection of modes of operation for the siren subsystem 24.

Figure 5:
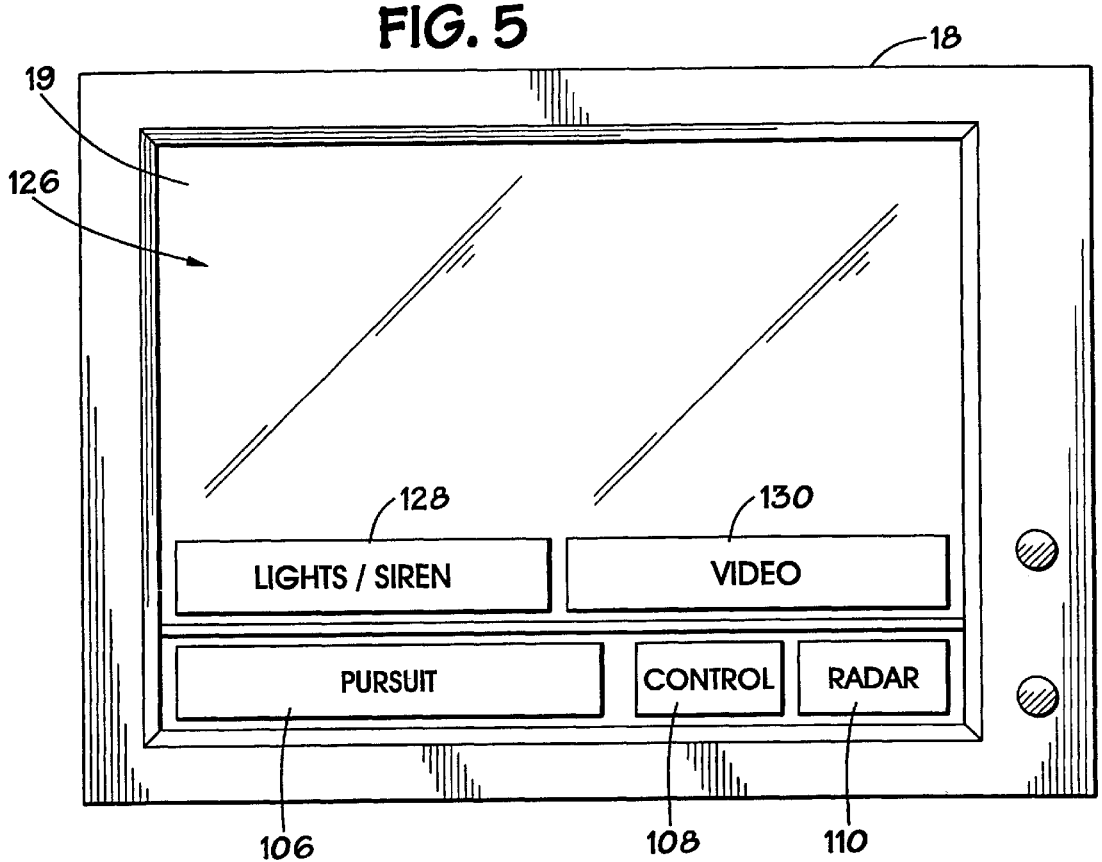
FIG. 5 depicts an exemplary touch screen display.

Referring now to FIG. 5, a light and siren control screen display 126 is depicted which provides control commands for individually modifying the light bar and siren subsystems 26, 24 or the video subsystem 30. The control screen display 126 will appear on tha touch screen 19 if the "CONTROL" button 108 is selected on the main screen 102. The screen display 126 will also appear if the "CONTROL" button 108 is selected from any other screen display, such as the "PURSUIT" screen 112, since the "CONTROL" button 108 is always an available command regardless of the particular screen display presented on the touch screen 19. The control screen display 126 includes buttons 128, 130 which are labeled "LIGHTS/SIREN" and "VIDEO," respectively.

If the "LIGHTS/SIREN" button 128 is selected, a light and siren screen display 132 (illustrated in FIG. 6) is presented on the touch sensitive screen 19. The light and siren screen display 132 provides a plurality of individual control commands for the siren subsystem 24 and for the light bar subsystem 26. The available commands for the light bar subsystem 26 include "TAKE DOWN" 134, "LEFT ALLEY" 136, "RIGHT ALLEY" 138, "MODE 1" 140, "MODE 2" 142, "MODE 3" 144, "ROTATE" 146, "FLASH" 148 and "SIGNAL MASTER" 150, all of which correspond to known programmed light patterns. By selection of a particular available command, the operator may select the appropriate programmed light pattern. The control commands for the light bar system 26 are typical of a hierarchical command structure. Similar hierarchical commands are available for the siren subsystem 24 on screen display 132 so that the operation of the siren subsystem 24 in one of several different available modes maybe selected. These commands include button 152 ("HI/LOW") which can be touched consecutively to toggle the siren subassembly 24 alternately between providing a high volume siren sound and a low volume siren sound. Other command buttons include "YELP" 154, "AIR HORN" 156, "MANUAL" 158, "WAIL" 160 and "PRIORITY" 162 which are primarily useful for changing the type of siren sound which is produced. If desired, the screen display 132 may also include screen paging arrows 164, 166 so that additional options for control of the siren subsystem 24 and light bar subsystem 26 may be displayed.

Referring now to FIG. 7, a video subsystem control display screen 170 is depicted. This display screen 170 permits a user to both view video being obtained by the video subsystem 30 and to control aspects of the video subsystem 30. The video subsystem control display screen 170 is displayed when the "VIDEO" button 130 is touched in either screen 126 or 132. The video subsystem control display screen 170 includes a central area 172 which is operable to display video provided by the selected "primary camera" in the video subsystem 30. As depicted in FIG. 7, the central area 172 is divided into four separate video display sections 174, 176, 178 and 180. Each of these display sections displays the video captured by one of the four cameras 32, 34, 36 and 38 in the video subsystem 30.

Video control buttons are located adjacent the central area 172 so that the operator can control the video displayed in the central area 172. Among these video control buttons is included a "CYCLE" button 182, which is used to sequence through each of the four video display sections 174, 176, 178, 180 such that the camera providing the images for each of the four video display sections is sequentially chosen as the "primary camera." A "SELECT" button 184 is included which, when selected, causes a selected video display section to be displayed in "full screen" to the exclusion of the remaining three video display sections. There is also a "GRAB" button 186 which, when selected, causes the frame grabber assembly to still the image from the primary camera screen display. Also included is a "ZOOM IN" button 188, "ZOOM OUT" button 190. Pressing these buttons will cause the image from the primary camera to "zoom in" or "zoom out," respectively. A "SEND" button 192 is included as well which selects a freeze frame image from the image provided by the primary camera and transmits that image digitally via the modem 84 to a predetermined remote location. Also, a "RECORD" button 194 is included. When this button is touched, it cause the VCR 40 to begin recording. The "EXIT" button, 196, allows the operator to leave the video subsystem control display screen 170 and be returned to the main menu screen 102.

Figure 8:
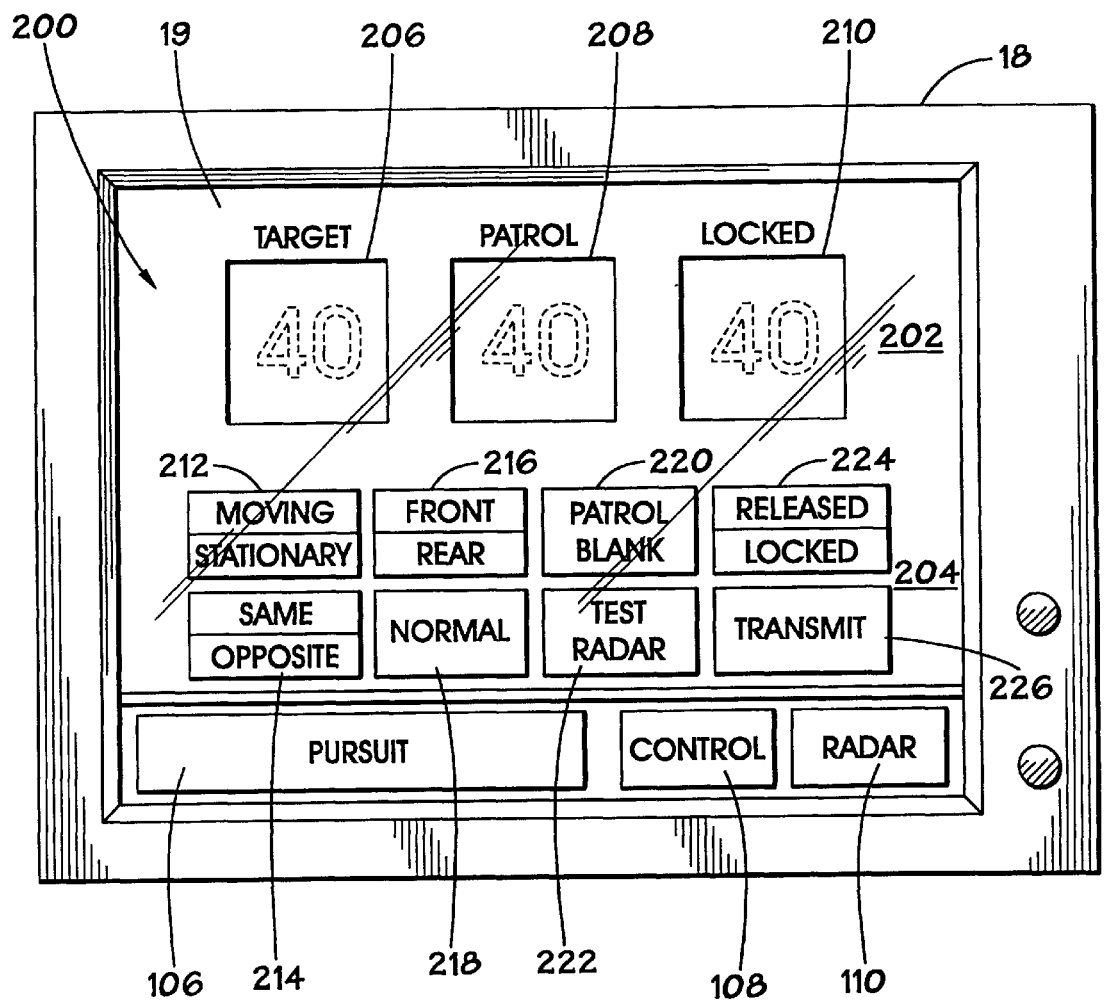
FIG. 8 depicts an exemplary touch screen display for control and viewing of results from the radar subsystem.

Hierarchical commands are also provided for control of the radar subsystem 28. Referring to FIG. 8, a radar control screen 200 is depicted which includes an upper display area 202 and a lower command area 204. The upper display area 202 includes a target speed display window 206, patrol car speed display window 208, and a locked speed window 210.

The lower command area 204 contains individual controls, which, in an exemplary embodiment include a "MOVING/STATIONARY" toggle button 212 which, when touched repeatedly will toggle alternately between a tracking condition wherein the tracking police vehicle 12 is in motion and one wherein the police vehicle 12 is stationary. Below button 212 is a "SAME/OPPOSITE" toggle button 214 which, when touched repeatedly will toggle alternately between a radar tracking condition wherein the tracking police vehicle 12 is moving in the same direction as the tracked vehicle and one in which the police vehicle 12 is moving in the opposite direction from the tracked vehicle.

The lower command area 204 also includes a "FRONT/REAR" toggle button 216 which can be operated in a similar manner to toggle between radar tracking conditions in which the tracked vehicle is located to the front of or to the rear of the police vehicle 12. Also included is a "NORMAL" button 218, a "PATROL BLANK" button 220, a "TEST RADAR" button 222, a "RELEASED/LOCKED" toggle button 224 and a "TRANSMIT" button 226.

It is noted that the organization of screens shown and that of the particular information depicted on screens is exemplary only and may be modified or changed as desired. Indeed, it is envisioned that such organization would be prescribed by individual local or state department policy. Also, individual screens maybe altered to include controls for additional devices or subsystems such as the police vehicle radio.

Figure 9A:
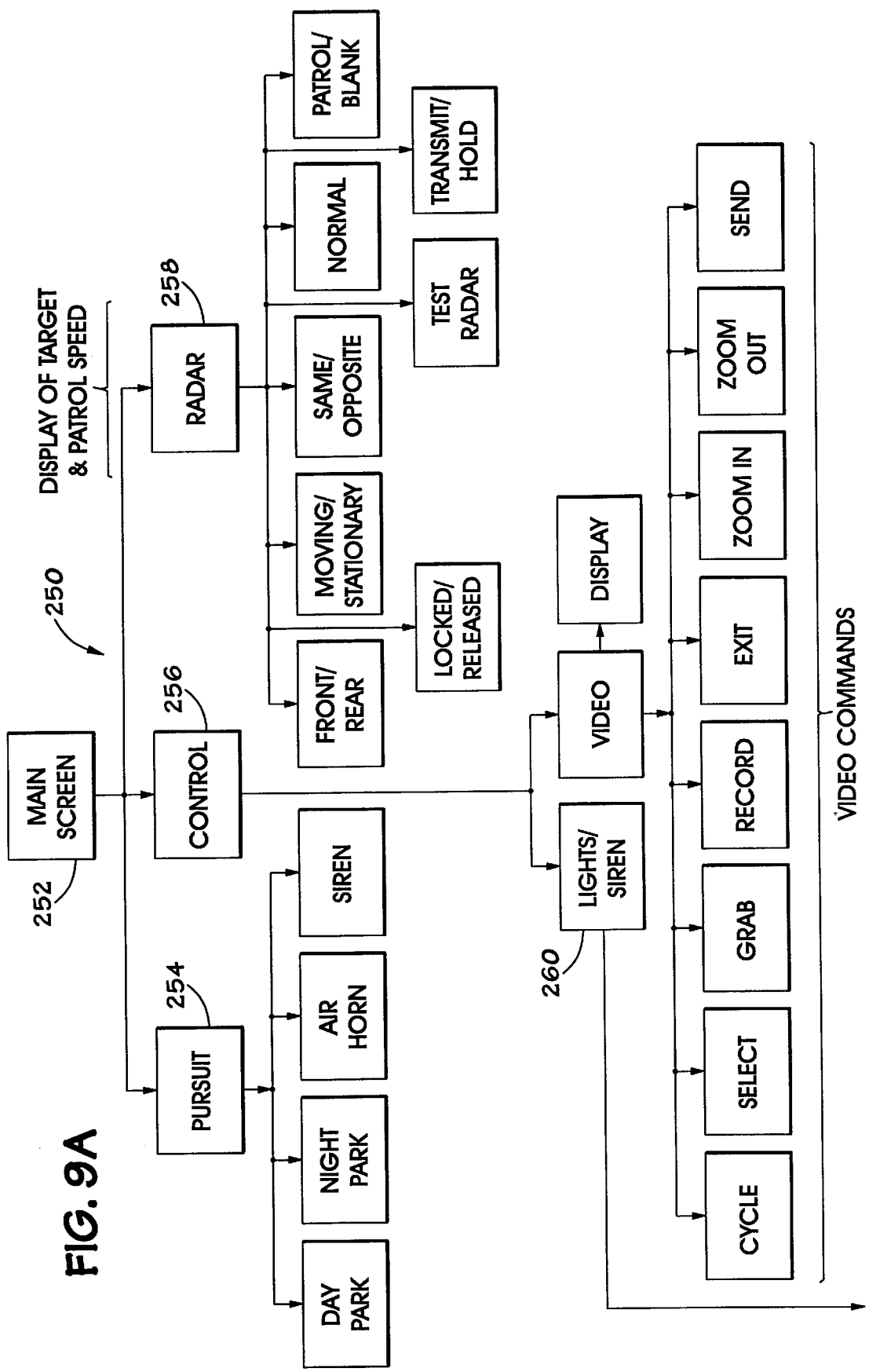
FIGS. 9A and 9B illustrate the hierarchical menu structure used by the control system 10.
Figure 9B:
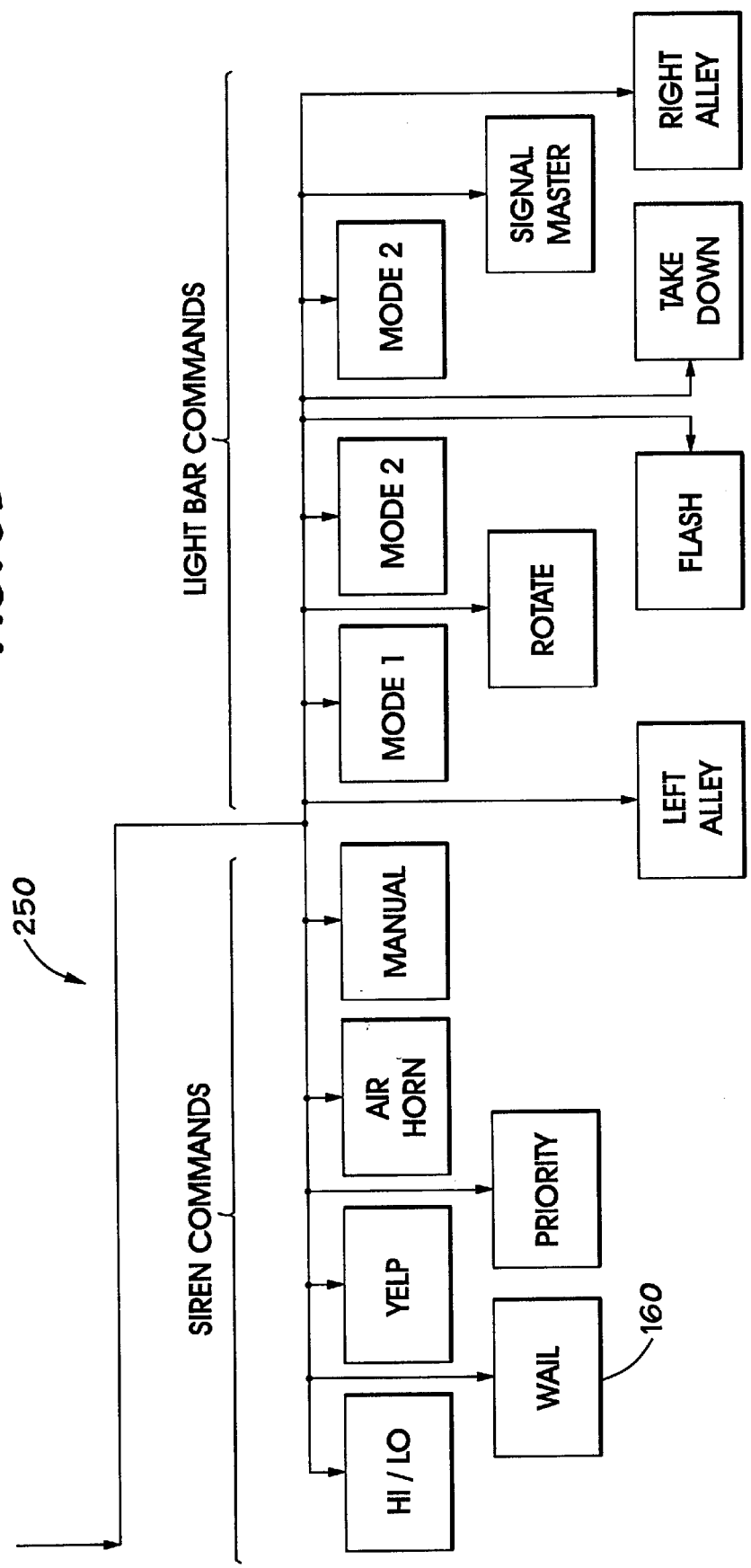

The control of individual subsystems using hierarchical menu commands is illustrated with reference to FIGS. 9A and 9B. There, an exemplary menu structure 250 is depicted which exemplifies the hierarchical command structure employed by the control system 10. Once the control system 10 has been initialized, in a manner will be described in further detail shortly, the main screen 102 is displayed. The step of displaying the main screen 102 is represented by block 252 in FIG. 9A. The user is provided with three initial choices for a consecutive step, these being represented by the "PURSUIT" 254, "CONTROL" 256 AND "RADAR" 258 blocks. Further alternative steps may be made after one of these choices is made, thus creating a well known decision tree by which a user may reach a desired condition by choosing among numerous consecutive steps. For example, if it is desired to operate the siren subsystem 24 to produce a "WAIL" type sound, a user would initialize the system so as to cause the main screen 102 to be displayed (box 250 in FIG. 9A). From there, the user would press the CONTROL button from the main screen 102 to cause the control screen 126 of FIG. 5 to be displayed. This condition is illustrated as box 256 in FIG. 14. Next, the user would press the LIGHTS/SIREN button 128 to access the light and siren screen display 132. This condition is depicted as block 260 in FIG. 9A. From screen 132, the user may select the WAIL button 160 which will cause the siren subsystem 24 to produce the appropriate "WAIL"-type siren sound.

Data Entry Communications and Relaying of Communications

Figure 17:
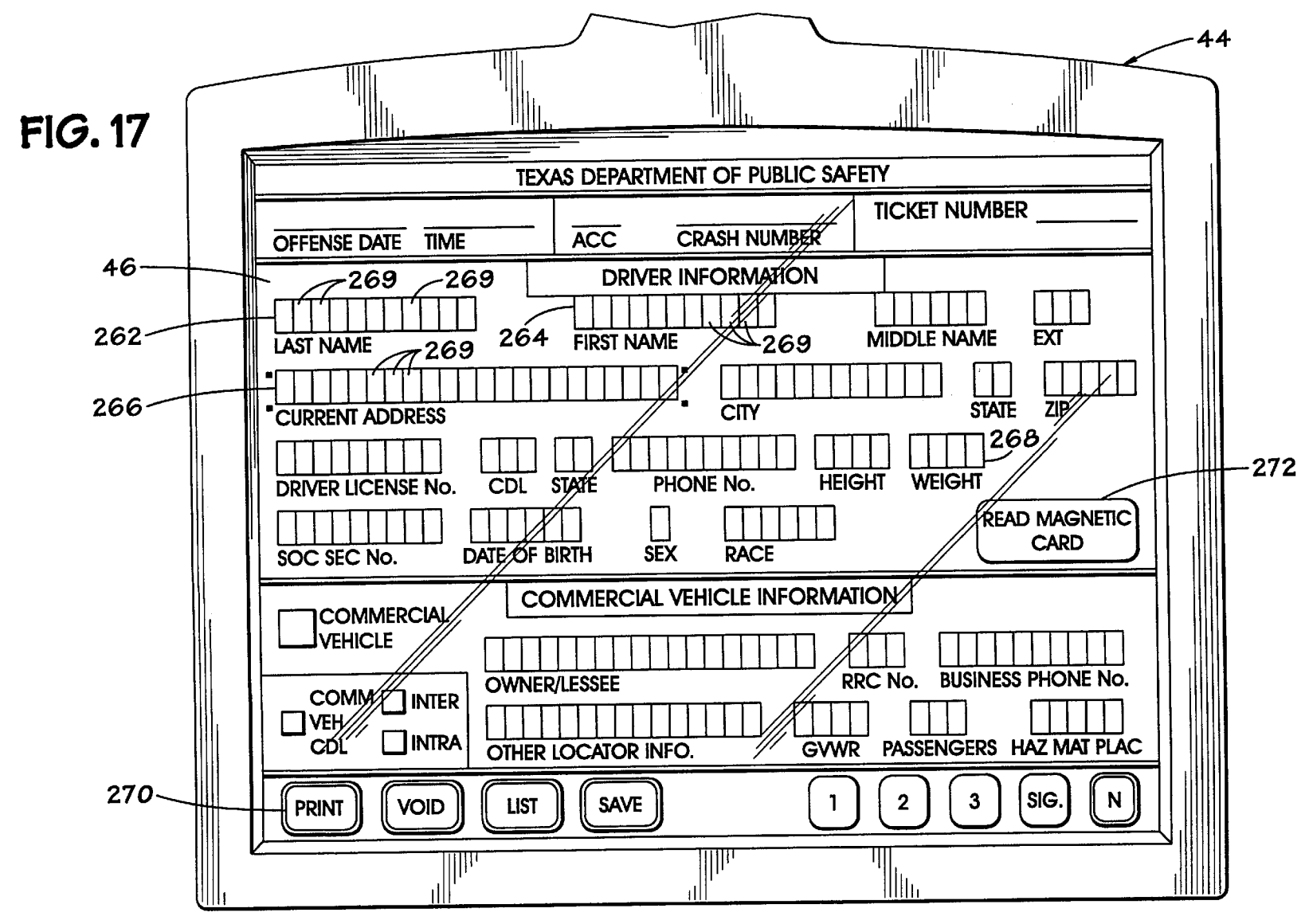

Information such as a driver's license number, driver's name, make and model of car, weather conditions and so forth can be recorded within the HHU 44 by entering it on the touch sensitive screen 46 of the HHU 44. An exemplary screen display for data entry is illustrated in FIG. 17. There, a "form" is displayed which contains a number of fields into which information, such as driver's information is entered. These fields, which include a driver's last name 262, first name 264, current address 266 and weight 268 are made up of a number of character positions 270 which may be filled with alphanumeric characters to complete them. The characters are entered in the positions 270 using the pen, or stylus, (not shown) which accompanies the HHU 44.

In addition to these data fields, the screen display presents touch-sensitive "buttons" which can be selected using the pen or stylus. Among the buttons are a "PRINT" button 270, which causes inputted information to be transmitted from the HHU 44 via the LAN adapter 48 to the LAN adapter 80 and, thereafter, printed out by the printer 42 in a manner which will be 15 described in greater detail shortly. Also included among the buttons is a "READ MAGNETIC CARD" button 272.

Figure 18:
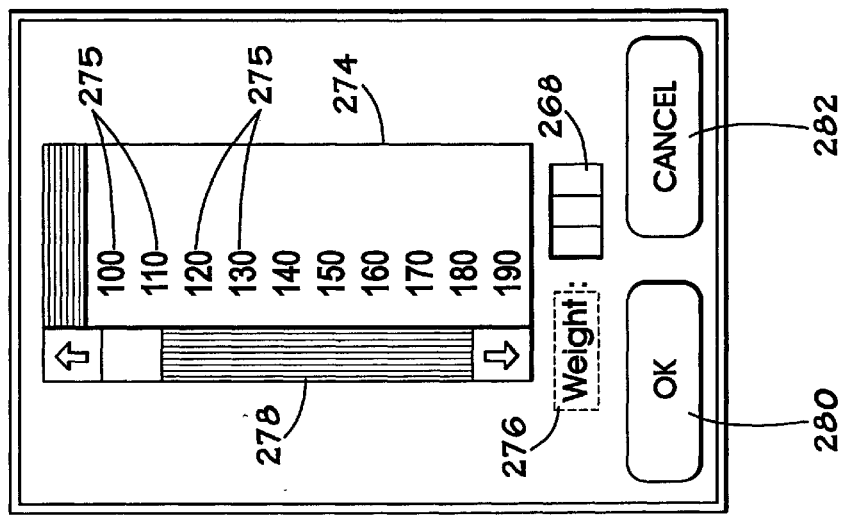
FIG. 18 illustrates a scrollable pick list which is used for data entry by the HHU 44.

As can be seen with reference to FIG. 18, data entry into the HHU 44 is partially automated through the use of scrollable pick lists for certain data entries so that the officer may choose from among a plurality of commonly entered choices. These lists also provide a time 20 saving means for recording commonly entered information. FIG. 18 illustrates a scrollable pick list 274 of alternative values for weights 275 from which an officer can select an appropriate choice with the pen or stylus. The list 274 is a "pop-up" type list which is activated when the pen or stylus touches the field name 276. A scroll bar 278 may be used to move among available selections. "OK" and "CANCEL" buttons 280, 282 are provided so that the officer can confirm his selection of a weight value or erase it.

It is noted that the software for the HHU 44 incorporates error checking functions which ensure that required fields are not left blank. This reduces the possibility of errors introduced during the recording of information. Further understanding of data entry features provided by the HHU 44 may be gained by examination of the computer code found in the microfiche appendix referenced at the beginning of this specification.

In addition, information contained in a barcode printed on, for example, an individual's driver's license or as a part of a Vehicle Identification Number, can be entered into the HHU 44 by swiping the barcode scanner 50 past the barcode.

Also, the magnetic stripe reader 47 may be used to record within the HHU 44 information which is encoded within a magnetic stripe disposed on a card, such as a drivers' license. To activate the magnetic stripe reader 47 for recording such information, the officer would actuate the "READ MAGNETIC CARD" button 272. The card, such as card 49 in FIG. 1, can then be "swiped" through the reader 47, as illustrated in FIG. 1 so that the information is read from the stripe on card 49 by the reader 47.

Once entered into the HHU 44, information is stored within the memory of the HHU. In addition to being stored within the HHU 44, the entered information is transferred via the wireless LAN 48 back to the wireless LAN 80 within the vehicle 12. FIG. 16 illustrates the transmission of information entered into the HHU 44 to the controller 22 where the information is retransmitted to a remote communications base 284.

Numerous wireless transmission carriers for information maybe used in accordance with the present invention. Infrared signals and radio frequencies are examples. However, it is presently preferred to transmit information over short distances, such as between LAN adapter 48 and LAN adapter 80 using a spread spectrum communications device, such as the Range LAIN 2, which establishes communication using a Transmission Control Protocol/internet Protocol (or TCP/IP) interface. It is also presently preferred to use cellular digital packaging data (CDPD) as a carrier for such information when it is transmitted over long distances, such as via the modem 84 to a remote communications base 284. CDPD service is available currently in many large cities from telecommunication companies, such as AT&T Telecommunications and cellular telephone service providers, such as GTE Mobilnet based in Houston, Tex.

Recently, studies have focussed on the time spent by police officers responding to vehicle accident scenes. A large portion of the time spent by officers at accident scenes is spent recording information concerning the vehicles involved in the accident, accident victims, circumstances and so forth. The studies have shown that patrol cars whose officers use a penbased computer unit to record such accident data spend 20%–50% less time at an accident scene than those whose officers record such data using pen and paper. Also, information recorded using a pen-based computer is less likely to be lost or misfiled than information recorded on copies of paper.

In still another aspect, the invention has application where there is a typical traffic stop of a vehicle as well. The invention permits an officer to enter driver and offense information (such as a driver's name, license number, and the description of a traffic offense committed) into the HHU 44 and print out a citation or ticket from the printer 42. The driver and offense information is transmitted by the LAN adapter 48 on the HHU 44 to the LAN adapter 80 in vehicle 12. The officer actuates a print command in the HHU 44 (i.e., selecting print button 270) to have the printer 42 print the citation.

Additionally, as FIG. 16 illustrates, data can be transmitted, using one of the methods described earlier, between the digital camera 52 and the LAN adapter 80. As a result, an officer can take a digital photograph using the camera 52. The digital photograph is transformed by the camera 52 into digital information which can be transmitted by the camera 52 through the LAN 5 adapter 80. The controller 22 receives the digital information so that it can be recalled later.

Further, the controller 22 can relay information between a local transmitter, such as the HHU 44 or the digital camera 52, and a remote communications base 284, such as a police communications base or dispatcher. For example, following a traffic stop, an officer could approach the vehicle he has stopped and, upon receiving driver's license and insurance information from the driver of the vehicle stopped, enter that driver information into the HHU 44. The LAN adapter 48 then transmits the driver information by wireless means to the LAN adapter 80. The controller 22 then causes the information received by the LAN adapter 80 to be transmitted via a cellular modem 82 to the remote communications base 284. At the remote communications base 284, the transmitted information may be stored within a central information storage repository, such as a regional or national database for such information.

During a traffic stop, an officer could also photograph a suspect with the digital camera 52. The digital image obtained by the camera 52 is then transmitted to the LAN adapter 80 in the manner previously described and relayed by the controller 22 to the remote communications base 284. As with other transmitted information, the digital image may be stored within a central repository for information of this type. At the remote communications base 284, the image also can be compared with other photographs, images or identifying information in order to identify the suspect.

In a related aspect of the invention, vehicle location information is obtained by the GPS subsystem 29 and relayed to the remote communication base 284. The GPS subsystem 29 obtains the location of the vehicle 12 according to a predetermined periodic schedule. This location information is then transmitted to the controller 22 via serial connection 68. Also in accordance with a predetermined periodic schedule, the controller transmits the location information to the remote communications base 284 via the modem 84. This feature permits the location of the vehicle 12 to be known by those at the remote base 284 without the need for making contact with the officer by conventional police radio.

The invention also permits the officer to have direct access to local, state and federal traffic and criminal records, even when the officer is outside of the police vehicle.

Additionally, the officer could access other relevant remote databases or sources of information, such as local area traffic information. The officer would enter driver information such as a vehicle license number, as described above, and then cause this information to be transmitted from the HHU 44, via LAN adapters 48 and 80, to the controller 22. Along with the information, a query is transmitted which will request that the information be compared to items contained within a particular database of information. The database might, for example, contain the license numbers for vehicles which have been reported as stolen. Upon receipt of the query, the controller 22 would compare the transmitted vehicle license number to entries within a database stored locally within the data storage memory associated with the motherboard 64. If no match is made, the controller 22 retransmits the query along with the driver's information via the modem 84 to the remote communications base 284 which contains databases which are more extensive than those maintained within the controller 22 on board the vehicle 12. The databases at the remote communications base 284 preferably correspond to a database of statewide, national or perhaps international scope. The remote communications base 284 uses comparison software similar to that used within by the controller 22 to receive the transmitted driver information and compare it to entries stored within these databases. A database query is made based upon one or more pieces of information, such as a driver's license number or license plate number. Based upon the query, the database is searched for a match.

General Operation of Controller 22

Figure 10:
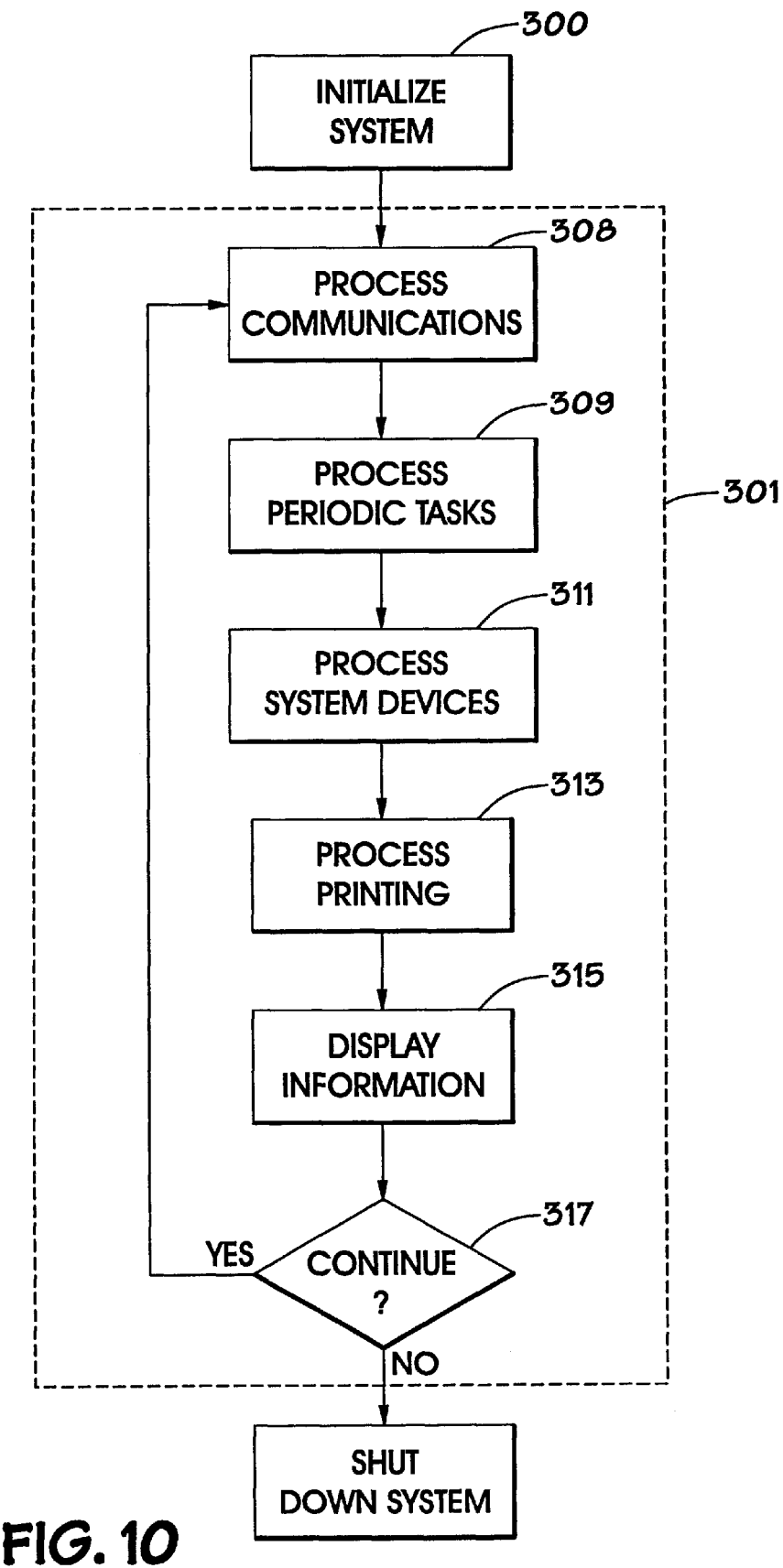
FIG. 10 is a flowchart illustrating portions of an exemplary control algorithm for the control system 10.

Those skilled in the art will recognize that there are numerous ways in which the motherboard 64 of the controller 22 could be programmed in a customized manner by a user to control peripheral subsystems and devices. In addition, detailed control logic descriptions, flow charts, and even source code are available from the manufacturers and retailers of various peripheral components which might be used, with proper permission or license, to program the motherboard 64. Nonetheless, aspects of operation and decision making for the controller 22 are now described with reference to FIGS. 10–15. FIG. 10 depicts the scheme for an exemplary control algorithm which could be used with the control system 10. FIGS. 11–15 each depict constituent portions of the control algorithm shown in FIG. 10.

When the control system 10 is started up, the controller 22 will initialize the system hardware and the control data. This operation is depicted in block 300 of FIG. 10. Following the initialization step 300, the controller 22 enters a control polling loop 301 and continues to follow the polling loop 301 until given a command to cease polling and shut down. The steps performed during the polling loop 301 are those of processing communications (step 308), processing periodic tasks (step 309), processing system devices (step 31 1), processing printing tasks (step 313) and displaying information (step 315).

Following the step of displaying information, the controller 22 determines whether it will continue the polling loop 301 or not. This is done by including a flag within the software which causes the controller 22 to make a choice between continuing or not. This decision is illustrated by box 317 in FIG. 10. The software flag should be initialized to default for continuing the polling loop 301 unless there is an event which causes it to do otherwise, such as a shut down command. If a shut down command is given, the controller 22 will cause the control system 10 to turn off the TCP/IP stack buffer and perform other functions associated with the shut down of a control system.

Figure 11:
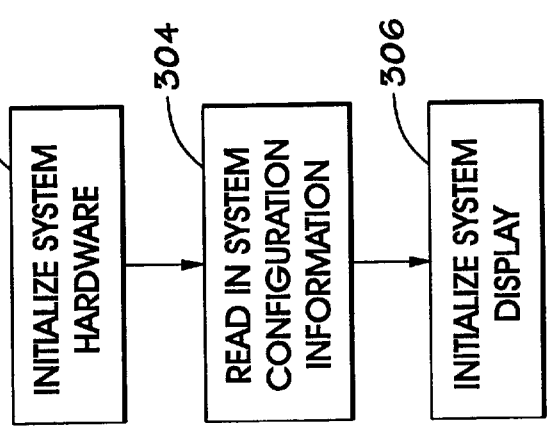

Substeps performed during the initialization step 300 are depicted in FIG. 11. In the first substep 302, the controller 22 initializes the hardware for the control system 10 to configure the port speeds for each device or subsystem which is interconnected with the ISC 66. The siren and light bar subsystems 24, 26 are reset so that all the lights and sirens are turned off or set to off. The GPS subsystem 29 requests that information obtained be provided in accordance with the format of the GPS manufacturer's particular protocol.

Also during substep 302, the primary camera is commanded by the controller 22 to display within the image it captures an identification number for the police vehicle 12. The VCR 40 begins to record images provided by the video camera which has been selected as the primary camera among the four video cameras 32, 34, 36 and 38. The radar subsystem 28 is initialized at its default settings which are established by local departmental procedure. Typically, this is a recording mode in which the VCR 40 will record video captured by the primary camera. The video camera subsystem 30 is initialized so that camera images will be provided by one of the cameras 32, 34, 36 and 38 in each of the video display sections 174, 176, 178 and 180 of the video subsystem control display screen 170 when that screen is accessed by a user.

In substep 304, the controller 22 reads in the configuration information from a controller data file into the RAM of the microprocessor of the controller 22. This configuration information data file is preferably stored in the same directory as the rest of the programming for the controller 22. In substep 306, the controller 22 sets the initial display (or main screen 102) for the user interface device 18.

Following the initialization step 300, the controller 22 performs a communications process step 308 in which it processes any communications of information which are to be transferred into or out of the controller 22.

Figure 12:
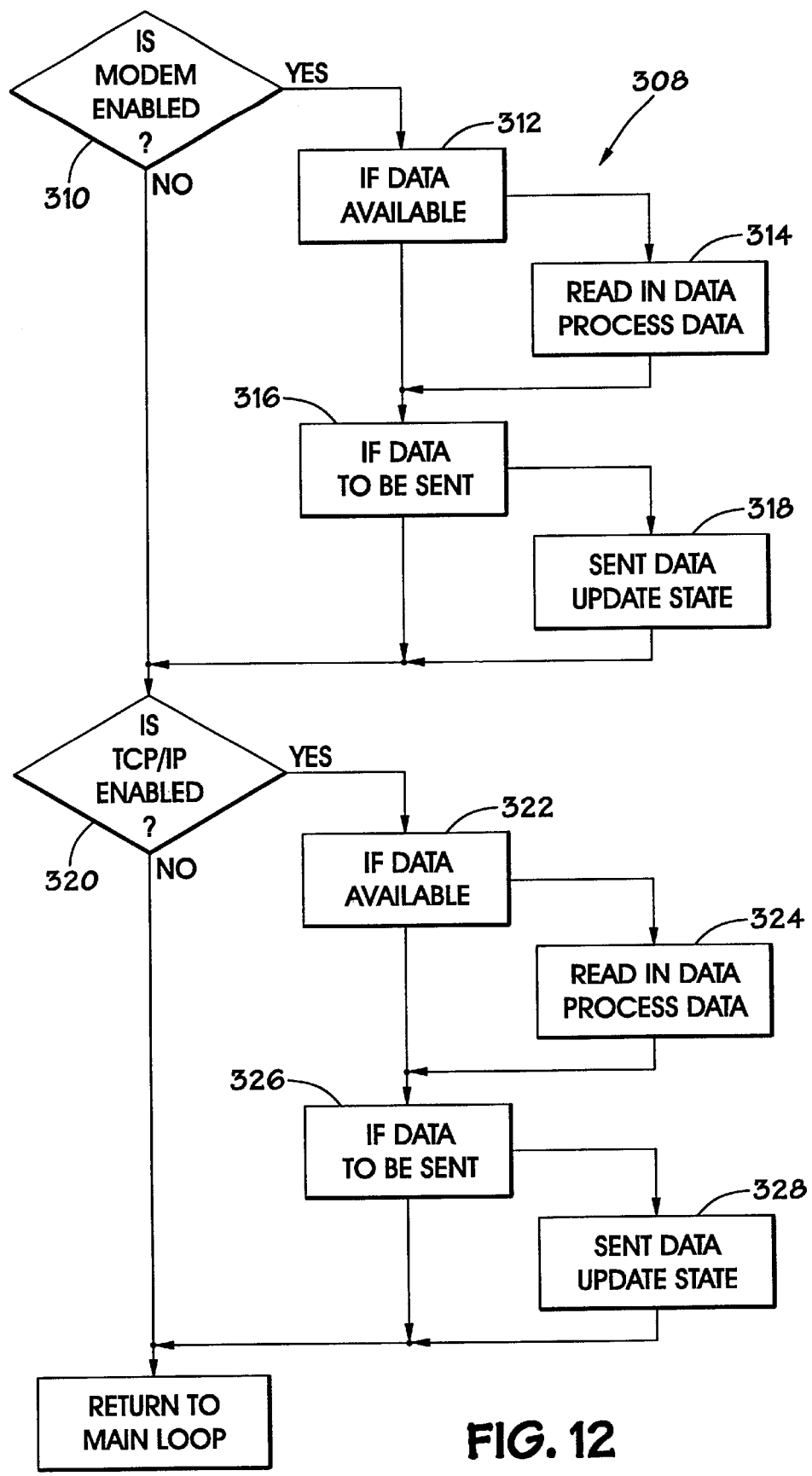

Referring to FIG. 12, a flow diagram is provided illustrating exemplary control logic used to perform the communications process step 308. First, in substep 310, the controller 22 determines whether the modem 84 is enabled for wireless transmission of information to a destination such as the remote communications base 284. In substep 312, the controller 22 then checks to see whether any communications information has been received by the modem 84 and is available to be processed. If there is such information, the controller 22 performs substep 314, in which the received information is read into the RAM memory of the motherboard 64.

The received information is then processed by the software routines. Essentially, two types of information are transferred: commands and status data. If the information received is a command, the controller 22 executes that command. If the information is status data, the controller 22 processes that data, for example, by storing an incoming .jpg to a file.

In substep 316, the controller 22 inquires whether any communications information is waiting to be sent by the modem 84. If so, the controller 22 causes the modem 84 to send the communications information through the modem 84 during substep 318. The controller 22 then updates its state, i.e., the condition of either sending information during the transmission or receiving a response from the receiver.

In substep 320, the controller 22 determines whether the TCP/IP interface is enabled for transmission of information to and from the wireless LAN adapter 80. Substeps 322, 324, 326 and 328 correspond to the substeps 312, 314, 316 and 318 described earlier with respect to the modem 84.

Figure 13:
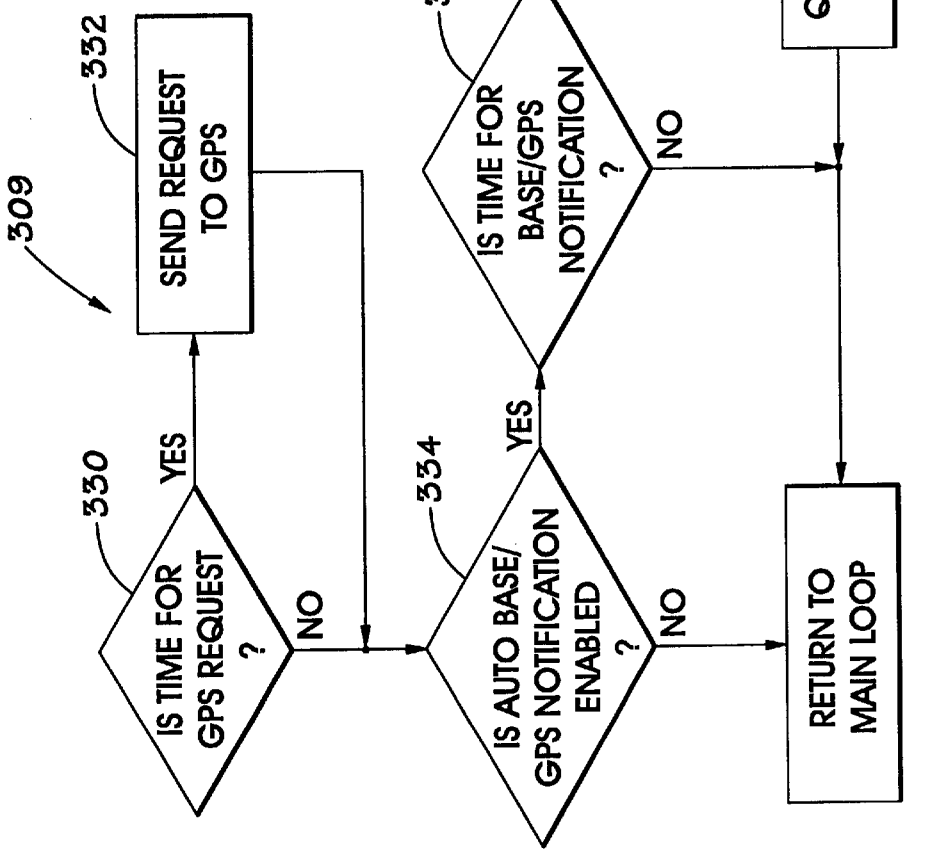

In the next step of general operation, step 309, the controller 22 processes tasks which are referred to as "periodic tasks" because they are not required to be performed every time the controller 22 performs its polling loop. Rather, these periodic tasks are performed in accordance with a predetermined time-based schedule. An example of a periodic task is that of obtaining location information for the vehicle 12 via the GPS subsystem 29 and relaying that information to the remote communications base 284. Typically, information regarding the location of the vehicle 12 is sought and updated twice per second. A location is relayed to the remote communications base 284 every 8 seconds. FIG. 13 depicts the substeps used by the controller to carry out the process of step 309. First, the controller 22 polls the GPS subsystem 29 to determine whether it is time for an update of GPS data to be obtained (substep 330). If it is time for such an update, the controller 22 commands the GPS subsystem 29 to request an update of the position information (substep 332). In substep 334, the controller 22 determines whether the "Auto Base/GPS notification" is enabled. The "Auto Base/GPS notification function causes automatic periodic notifications of the position of the vehicle 12 (as determined by the GPS subsystem 29) to be provided to the remote communications base 284 via the modem 84. In substep 336, the controller 22 determines whether it is time to notify the remote communications base 284 of the updated position information. The controller 22 will queue the position information to the modem 84 in substep 338.

In the next step of general operation, step 311, the controller 22 polls all controlled subsystems. The substeps associated with this step are depicted in FIG. 14. First, the controller 22 determines whether data is available from the touch screen 19. This is depicted as substep 340 in FIG. 14. Touches upon the touch screen 19, having been previously buffered by a driver, are recalled by the controller 22 and used as control input signals. If such inputs are available, the controller 22 retrieves and processes this data in substep 342. Next, the controller 22 determines whether data is available from the GPS subsystem 29 (substep 344). If so, the controller 22 then retrieves the data, processes it and displays it on the touch screen 19 (substep 346). Similar substeps are then performed to obtain, process and display data for the light bar subsystem 26 (substeps 348, 350) and the radar subsystem 28 (substeps 352, 354). Similar steps can be performed for any other controlled subsystems associated with the control system 10. It is noted that control of subsystems in steps 309 and 311 will occur so that device control commands will be provided to a plurality of selected controlled subsystems during a single polling loop. As a result, the device control commands are provided to a plurality of controlled subsystems relatively simultaneously.

In the next step of general operation, step 313, the controller 22 processes-print commands which have been received from the HHU 44 to cause the printer 42 to execute a print job according to a predetermined form for printing. The particular form for printing may be prescribed by local or departmental policy. Ordinarily, however, the form for printing will correspond to a citation, ticket or warning which is issued in response to a traffic violation. The substeps used in carrying out step 313 are shown in FIG. 15. Step 313 results in printing of a document, such as a traffic citation, after a print command and an item of information (such as a database file) are received by the controller 22 from the HHU 44. In substep 356, the controller 22 determines whether a print job is recorded in the print queue. Currently, a print job is printed only after other system tasks, such as transmissions of information using the modem 84 or the LAN adapter 80, have been completed. Therefore, the controller 22 determines, at substep 358, whether each such task has been completed. If so, the print job is executed at substep 360.

In the step 315 of general operation, the controller 22 causes the touch screen 19 to display current information. Further detail concerning the controller operations described here is available by reference to the microfiche appendix which is referenced at the beginning of this specification.

By performing the polling loop 301 as described, the controller 22 continuously operates to process incoming and outgoing communications and asserts control and monitoring of all the peripheral subsystems.

It is noted that control and communications processing could also be achieved using an event driven method. In that case, individual actions (a communications transaction or a control action) is performed via interrupts caused by individual devices in the system. Individual events would L include input commands entered into the user interface device 18 or receipt of information into the TCP/IP stack. Those of skill in the art will recognize that alternative programming techniques of this nature are well understood and may be accomplished with minimal effort once the general control and communication parameters of the invention are understood.

Stored information may be downloaded from an HHU 44 into a workstation located at a police station or otherwise. Downloading or transferring of the information can be performed using the LAN adapter 48 in a manner similar to that described earlier, provided that the workstation is equipped with an adapter, or other device which is capable of receiving the information transmitted and transferring it into databases as desired. Preferably, transmission is done using commonly accepted protocols such as File Transfer Protocol (FTP).

When the information is downloaded, it is placed into an appropriate master database or even multiple databases so that it can be recalled as necessary. The information can also be viewed on the workstation screen, printed out by an associated printer or sent to a recipient using an electronic mail program. The workstation must be preprogrammed to receive such information and store it within the appropriate databases. Exemplary source code for such programming is found in the microfiche appendix to this specification.

The present invention has been described with respect to specific embodiments thereof, but is not so limited. For example, the invention contemplates that numerous remote communication means other than cellular data packet transmission (CDPD) may be employed for communicating data or information between the computer unit 44 and the central controller 22. Modifications could be made to the structure and operation of the controlled subsystems without falling outside the scope of the claimed invention. Also, the specific control commands provided to the controlled subsystems or the manner in which these commands are organized can be altered.

Further, other devices or subsystems may be easily substituted for those specifically named herein, while still remaining within the scope of the invention, thereby permitting the invention to be adapted to different types of vehicles or within different applications. For example, controlled subsystems might comprise a cruise control subsystem and a collision avoidance system used by a civilian vehicle. Additionally, the controller might be used on board a military vehicle to control radio and other systems. Those of skill in the art will understand that many other various changes and modifications may be made while remaining within the scope and spirit of the invention.

What is claimed is:

1. A data processing system to be utilized in an emergency-response vehicle, said data processing system comprising:

a processor;

a controller coupled to said processor;

a plurality of communication links coupled to said controller, wherein said plurality of communication links are configured to interface with various peripheral devices intended for said emergency-response vehicle; and a touch-sensitive display device, coupled to said controller, to allow a user to activate more than one of said peripheral devices that are coupled to said plurality of communication links by pressing a graphical icon on a graphical user interface displayed on said touch-sensitive display device.

2. The data processing system according to claim 1, wherein said touch-sensitive display device allows a user to simultaneously activate more than one of said peripheral devices that are coupled to said plurality of communication links via a single touch on a graphical icon displayed on said touch-sensitive display device.

3. The data processing system according to claim 1, wherein said plurality of peripheral devices includes an overhead light bar and a siren.

4. The data processing system according to claim 3, wherein said plurality of peripheral devices further includes a global positioning system unit for locating position information of said emergency-response vehicle and a transmitter for transmitting said position information.

5. The data processing system according to claim 3, wherein said plurality of peripheral devices includes a video capturing system.

6. The data processing system according to claim 3, wherein said plurality of peripheral devices includes an audio announcement system.

7. A method for controlling a plurality of peripheral devices installed in an emergency-response vehicle, said method comprising:

connecting said plurality of peripheral devices to a central controller; and simultaneously activating more than one of said plurality of peripheral devices via a single touch on a graphical icon displayed on a touch-sensitive screen that is coupled to said central controller.

8. The method according to claim 7, wherein said plurality of peripheral devices includes an overhead light bar and a siren.

9. The method according to claim 8, wherein said plurality of peripheral devices further includes a global positioning system unit for locating position information of said emergency-response vehicle and a transmitter for transmitting said position information.

10. The method according to claim 8, wherein said plurality of peripheral devices includes a video capturing system.

11. The method according to claim 8, wherein said plurality of peripheral devices includes an audio announcement system.

12. A computer program product for controlling a plurality of peripheral devices installed in an emergency-response vehicle, wherein said plurality of peripheral devices are connected to a central controller, said computer program product comprising:

program codes means for providing communications between said plurality of peripheral devices and a central controller; and program code means for simultaneously activating more than one of said plurality of peripheral devices via a single touch on a graphical icon displayed on a touch-sensitive screen that is coupled to said central controller.

13. The computer program product according to claim 12, wherein said plurality of peripheral devices includes an overhead light bar and a siren.

14. The computer program product according to claim 12, wherein said plurality of peripheral devices further includes a global positioning system unit for locating position information of said emergency-response vehicle and a transmitter for transmitting said position information.

15. The computer program product according to claim 12, wherein said plurality of peripheral devices includes a video capturing system.

16. The computer program product according to claim 12, wherein said plurality of peripheral devices includes an audio announcement system.

* * * * *